US011029201B2

(12) United States Patent
Ishikawa et al.

(10) Patent No.: US 11,029,201 B2
(45) Date of Patent: Jun. 8, 2021

(54) ABNORMALITY DETECTOR

(71) Applicant: Fukada Kogyo Co., Ltd., Nagoya (JP)

(72) Inventors: Ryo Ishikawa, Komaki (JP); Takeshi Takashima, Komaki (JP); Kenji Kido, Nagoya (JP); Masanori Hirasawa, Komaki (JP); Yuichiro Hanai, Komaki (JP)

(73) Assignee: Fukada Kogyo Co., Ltd., Nagoya (JP)

( * ) Notice: Subject to any disclaimer, the term of this patent is extended or adjusted under 35 U.S.C. 154(b) by 33 days.

(21) Appl. No.: 16/607,513

(22) PCT Filed: Feb. 21, 2018

(86) PCT No.: PCT/JP2018/006298
§ 371 (c)(1),
(2) Date: Oct. 23, 2019

(87) PCT Pub. No.: WO2018/198504
PCT Pub. Date: Nov. 1, 2018

(65) Prior Publication Data
US 2020/0141796 A1    May 7, 2020

(30) Foreign Application Priority Data

Apr. 27, 2017  (JP) .............................. JP2017-088953
Apr. 27, 2017  (JP) .............................. JP2017-088954

(51) Int. Cl.
*G01J 1/42*     (2006.01)
*G01J 1/04*     (2006.01)
(Continued)

(52) U.S. Cl.
CPC .......... *G01J 1/4228* (2013.01); *G01J 1/0488* (2013.01); *G01J 1/0492* (2013.01); *G01J 5/0018* (2013.01);
(Continued)

(58) Field of Classification Search
CPC .. G01J 5/60; G01J 5/602; G01J 5/0018; G01J 2005/106; G01J 1/4228; G01J 1/0492; G01J 1/0488; G08B 17/12
See application file for complete search history.

(56) References Cited

U.S. PATENT DOCUMENTS 6,064,064 A * 5/2000 Castleman ............. G08B 17/12
                                                 250/339.05
6,255,651 B1  7/2001 Laluvein et al.
(Continued)

FOREIGN PATENT DOCUMENTS

CN   101577033 A   11/2009
JP   H01-074696 A  3/1989
(Continued)

OTHER PUBLICATIONS

International Search Report issued in corresponding International Patent Application No. PCT/JP2018/006298 dated Apr. 10, 2018.
(Continued)

*Primary Examiner* — Michael C Bryant
(74) *Attorney, Agent, or Firm* — Morgan, Lewis & Bockius LLP

(57) ABSTRACT

The disclosure provides respective detection devices of a sensor array that detect infrared light and convert the infrared light into a DC component electrical signal.

19 Claims, 17 Drawing Sheets

(51) Int. Cl.
*G01J 5/00* (2006.01)
*G01J 5/60* (2006.01)
*G08B 17/12* (2006.01)

(52) U.S. Cl.
CPC ............... *G01J 5/60* (2013.01); *G01J 5/602* (2013.01); *G08B 17/12* (2013.01)

(56) References Cited

U.S. PATENT DOCUMENTS 9,990,824 B2   6/2018  Rao et al.
9,990,825 B2   6/2018  Rao et al.

FOREIGN PATENT DOCUMENTS

| | | |
|---|---|---|
| JP | H03-263197 A | 11/1991 |
| JP | H08-115480 A | 5/1996 |
| JP | H08-190680 A | 7/1996 |
| JP | H10-326391 A | 12/1998 |
| JP | 2002-042263 A | 2/2002 |
| JP | 2010-175562 A | 8/2010 |
| JP | 2017-076304 A | 4/2017 |

OTHER PUBLICATIONS

Office Action issued in related Chinese Patent Application No. 2018800265263 Mar. 10, 2021.

\* cited by examiner

ABNORMALITY DETECTOR

TECHNICAL FIELD

The present invention relates to an abnormality detector.

BACKGROUND ART

Existing radiation-type fire detectors include various types such as fixed radiation types that detect when radiated energy of a specific waveband emitted from a fire reaches a given value or greater, flicker types that detect flickering distinctive to a fire, and duel IR and triple IR types that compare the magnitude of radiated energy over plural wavebands. Such radiation-type fire detectors include fire detectors that detect radiated light such as ultraviolet rays or infrared rays emitted from a fire using light sensors (for example photodiodes, pyroelectric sensors, discharge tubes, or the like) (Japanese Patent Application Laid-Open (JP-A) Nos. H01-74696, H03-263197, and H08-115480).

Examples of specific structures for an infrared flame detector include configurations provided with plural sensors that include a sensor to capture a resonance radiation band of carbon dioxide gas (in the vicinity of 4.3 µm to 4.5 µm) and one or more sensors to capture the long wavelength side and/or the short wavelength side of the carbon dioxide gas resonance radiation band. Signals of these sensors are amplified, subjected to A/D conversion, and used for determination by an arithmetic processing unit having an inbuilt flame detection algorithm.

An example of known technology employing a sensor to output a signal according to the change amount in received infrared rays is technology in which a frequency component distinctive to flames (flickering) is extracted from frequency components of a background signal and used to determine a fire.

An example of known technology to output a signal according to an absolute value of infrared rays received is technology in which the signal from a sensor includes components resulting from environmental changes (for example background infrared radiation, diurnal temperature variation, and the like). In this technology the difference (change amount) between such environmental noise (a signal that changes relatively gradually) and a signal that changes suddenly is employed to determine the presence of flames (JP-A No. H10-326391).

Treating the change amount of each of the sensors as a signal enables flame detection to be performed in a manner not affected by the background environment. Moreover, the presence of flames can basically be determined merely from the change amount in the signal corresponding to carbon dioxide gas resonance radiation band being large.

SUMMARY OF INVENTION

Technical Problem

However, this technology does not identify the position of the fire, and is therefore not compatible with pinpoint firefighting.

In order to address the above issues, an object of the present invention is to provide an abnormality detector capable of precisely detecting the presence of flames or abnormal temperatures at individual positions.

Solution to Problem

In order to achieve the above object, an abnormality detector according to a first aspect is configured including plural band filters, a detection section, and a determination section. The plural band filters include a first band filter configured to allow passage of infrared light in a first band including a peak wavelength of a carbon dioxide gas resonance radiation band, a second band filter configured to allow passage of infrared light in a second band that is different from the first band and that has a band center positioned away from a band center of the carbon dioxide gas resonance radiation band, and a third band filter configured to allow passage of infrared light in a third band that is different from both the first band and the second band and that has a band center positioned away from the band center of the carbon dioxide gas resonance radiation band. The detection section includes detection devices respectively provided to each of the plural band filters and configured to detect infrared light that has passed through the corresponding band filter and convert the infrared light into an electrical signal, a detection device provided at at least one of the plural band filters being comprising a sensor array arrayed in a two-dimensional pattern. The determination section is configured to determine whether a flame or an abnormal temperature has been detected, based on values of the electrical signals detected by the respective detection devices of the detection section.

In an abnormality detector according to a second aspect, the detection section includes a first sensor array arrayed in a two-dimensional pattern and having first detection devices each configured to detect infrared light that has passed through the first band filter and convert the infrared light into an electrical signal, a second sensor array arrayed in a two-dimensional pattern and having second detection devices each configured to detect infrared light that has passed through the second band filter and convert the infrared light into an electrical signal, and a third sensor array arrayed in a two-dimensional pattern and having third detection devices each configured to detect infrared light that has passed through the third band filter and convert the infrared light into an electrical signal. Moreover, the determination section is configured to determine whether a flame or an abnormal temperature has been detected based on any combination of electrical signal values among an electrical signal value detected by the respective first detection devices of the first sensor array, an electrical signal value detected by the respective second detection devices of the second sensor array, or an electrical signal value detected by the respective third detection devices of the third sensor array.

In an abnormality detector according to a third aspect, the plural band filters further include a fourth band filter configured to allow passage of infrared light in a predetermined band. Moreover, the detection section includes a first detection device configured to detect infrared light that has passed through the first band filter and convert the infrared light into an electrical signal, a second detection device configured to detect infrared light that has passed through the second band filter and convert the infrared light into an electrical signal, a third detection device configured to detect infrared light that has passed through the third band filter and convert the infrared light into an electrical signal, and a sensor array arrayed in a two-dimensional pattern and having fourth detection devices each configured to detect infrared light that has passed through the fourth band filter and convert the infrared light into an electrical signal. Furthermore, the determination section is configured to determine whether a flame or an abnormal temperature has been detected based on any combination of signal values among an electrical signal value detected by the first detection device, an electrical signal value detected by the second detection device, or an electrical signal value detected by the third detection device, and in a case in which determination has been made that a flame or an abnormal temperature has been detected, to determine a position where the flame or the abnormal temperature has been detected based on electrical signal values detected by the respective fourth detection devices of the sensor array.

Advantageous Effects of Invention

The abnormality detector of an aspect of the present invention exhibits the advantageous effect of enabling the presence of flames or abnormal temperatures to be precisely detected at individual positions.

DESCRIPTION OF EMBODIMENTS

Detailed explanation follows regarding exemplary embodiments of the present invention, with reference to the drawings.

Outline of Exemplary Embodiments of Present Invention

Explanation follows regarding the principles behind flame detection.

Figure 6:
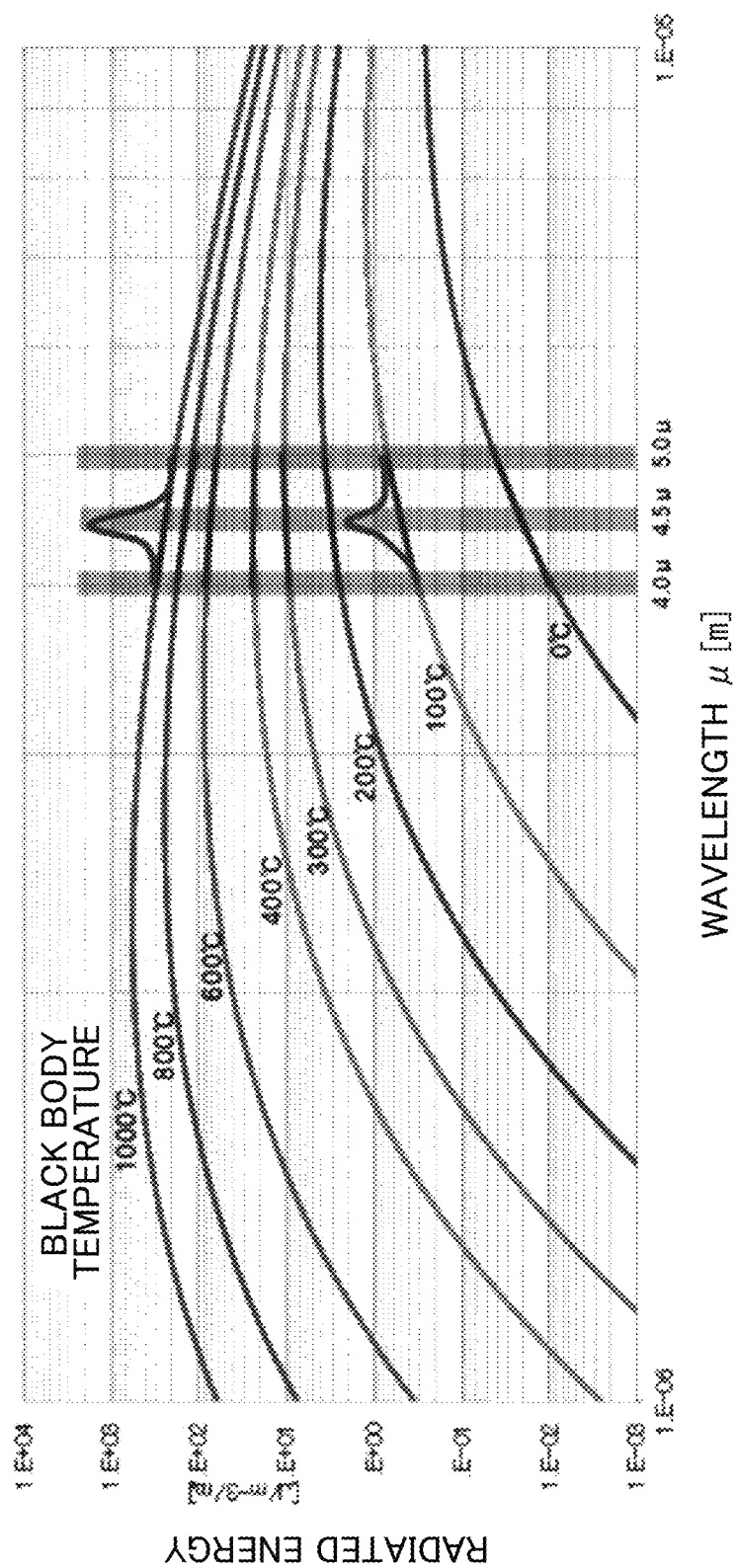
FIG. 6 is a graph illustrating energy radiated by a black body by wavelength.

According to the Stefan-Boltzmann law, it is known that the energy radiated from a black body has the wavelength properties illustrated in FIG. 6. The radiation peak at each temperature obeys Wien's displacement law, and it is known that the relationship between wavelength and energy in the vicinity of the carbon dioxide gas resonance radiation band can be approximated by a straight line.

Accordingly, straight line approximation using obtained signal values of band-filtered infrared sensors that respectively sense in the vicinity of 4.0 µm and in the vicinity of 5.0 µm can be employed to derive the amount of gray radiation caused by smoke or the like in the carbon dioxide gas resonance radiation band. Eliminating the gray radiation amount as an amount of noise enables the carbon dioxide gas resonance radiation amount to be isolated. This can then be compared against a threshold value to determine the presence of flames. Moreover, modifying the detection sensitivity according to the noise amount enables the presence of flames to be determined more precisely.

Employing an array of sensors arrayed in a two-dimensional pattern as detection devices enables the presence of flames to be determined for individual positions or individual areas.

First Exemplary Embodiment

System Configuration

Explanation follows regarding an abnormality detector according to a first exemplary embodiment of the present invention.

Figure 1:
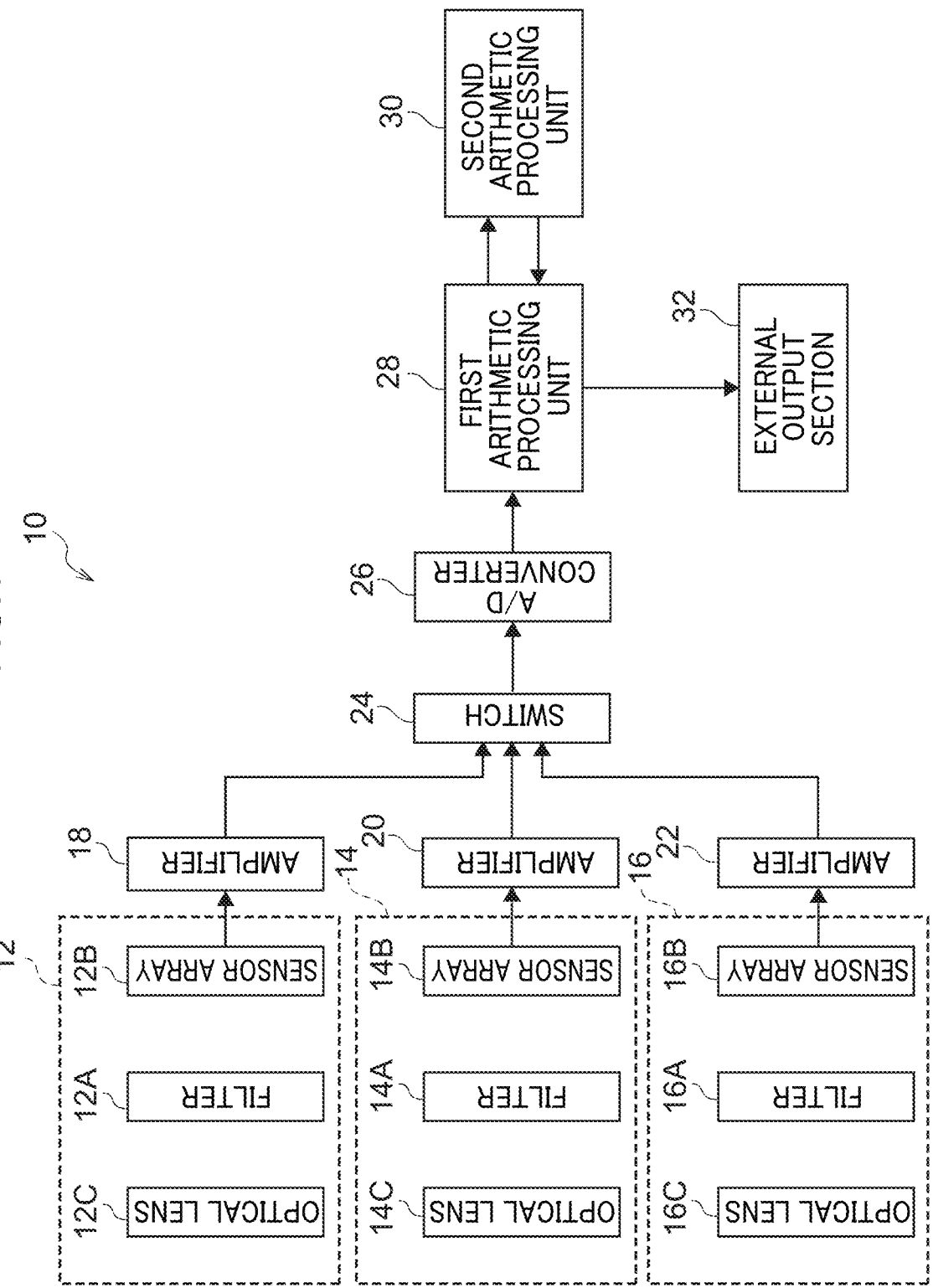
FIG. 1 is a block diagram illustrating configuration of an abnormality detector according to a first exemplary embodiment of the present invention.

As illustrated in FIG. 1, an abnormality detector 10 according to a first exemplary embodiment of the present invention includes a first sensor 12, a second sensor 14, and a third sensor 16. The first sensor 12 detects infrared light in a band in the vicinity of 4.5 µm corresponding to a carbon dioxide gas resonance radiation band emitted from flames. The second sensor 14 detects infrared light in a band in the vicinity of 4.0 µm corresponding to a waveband shorter than the carbon dioxide gas resonance radiation band. The third sensor 16 detects infrared light in a band in the vicinity of 5.0 µm corresponding to a waveband longer than the carbon dioxide gas resonance radiation band. The abnormality detector 10 further includes an amplifier 18 to amplify a signal from the first sensor 12, an amplifier 20 to amplify a signal from the second sensor 14, an amplifier 22 to amplify a signal from the third sensor 16, a switch 24 to amplify signals from the respective amplifiers 18, 20, 22, and an A/D converter 26 configured to convert a signal from the switch 24 to a digital value. The abnormality detector 10 further includes a first arithmetic processing unit 28 to control pre-processing for flame detection and an external output section 32, a second arithmetic processing unit 30 to perform flame detection processing, and the external output section 32.

The first sensor 12 includes a filter 12A that allows the passage of infrared light in a band in the vicinity of 4.5 µm corresponding to the carbon dioxide gas resonance radiation band emitted from flames, a sensor array 12B arrayed in a two-dimensional pattern with detection devices that detect infrared light that has passed through the filter 12A and convert the infrared light into a DC component electrical signal, and an optical lens 12C disposed in front of the filter 12A.

The second sensor 14 includes a filter 14A that allows the passage of infrared light in a band in the vicinity of 4.0 µm corresponding to a waveband shorter than the carbon dioxide gas resonance radiation band, a sensor array 14B arrayed in a two-dimensional pattern with detection devices that detect infrared light that has passed through the filter 14A and convert the infrared light into a DC component electrical signal, and an optical lens 14C disposed in front of the filter 14A.

The third sensor 16 includes a filter 16A that allows the passage of infrared light in a band in the vicinity of 5.0 µm corresponding to a waveband longer than the carbon dioxide gas resonance radiation band, a sensor array 16B arrayed in a two-dimensional pattern with detection devices that detect infrared light that has passed through the filter 16A and convert the infrared light into a DC component electrical signal, and an optical lens 16C disposed in front of the filter 16A.

The respective detection devices of the sensor array 12B are disposed so as to correspond to the respective detection devices of the sensor array 14B and the respective detection devices of the sensor array 16B.

The sensor arrays 12B, 14B, 16B detect infrared light at a predetermined monitoring angle (for example 90°), and the corresponding detection devices of the sensor array 12B, detection devices of the sensor array 14B, and detection devices of the sensor array 16B detect infrared light in the same predetermined region as each other.

The optical lenses 12C, 14C, 16C are each configured by one or more lenses. Note that the optical lenses 12C, 14C, 16C are preferably each configured by two or more lenses. This is in order to connect up the focal points of the detection devices of the sensor array 12B, the focal points of the detection devices of the sensor array 14B, and the focal points of the detection devices of the sensor array 16B in a flat plane as far as possible over wide monitoring angles thereof. In order to reduce loss caused by lens reflection, an anti-reflection layer (AR coating) may be vapor-deposited on the lenses to improve the sensitivity of the detection devices. Materials that may be employed for the lenses include sapphire, chalcogenide glass, silicon, germanium, and the like.

Note that sensors that are the same as the first sensor 12 may be further provided in order to reliably capture a weak electrical signal when detecting infrared light in a band in the vicinity of 4.5 µm corresponding to the carbon dioxide gas resonance radiation band.

Although the detection devices of the sensor arrays 12B, 14B, 16B are configured by thermopiles, the detection devices may alternatively be configured by other photovoltaic devices such as InAsSb elements, microbolometer elements that employ changes in resistance, or photoconductive elements such as PbSe elements. Note that such other elements detect infrared rays much faster than thermopiles and microbolometers. This enables an abnormality detector capable of very quickly detecting the presence of flames to be configured using the same circuit configuration, due to the higher speed of A/D conversion.

The amplifiers 18, 20, 22 respectively amplify electric signals of the respective detection elements of the first sensor 12, electric signals of the respective detection elements of the second sensor 14, and electric signals of the respective detection elements of the third sensor 16 independently of each other.

The switch 24 includes a switching section (not illustrated in the drawings) that switches sequentially through the electrical signals independently amplified by the amplifiers 18, 20, 22 at a given timing so as to be consolidated into a single electrical signal. The consolidated electrical signal is then output from the switching section. Alternatively, configuration may be made in which the switch 24 is not provided, and an A/D converter is provided separately for each of the amplifiers 18, 20, 22 such that amplified electrical signals are individually converted into digital values and output to the first arithmetic processing unit 28.

Figure 2:
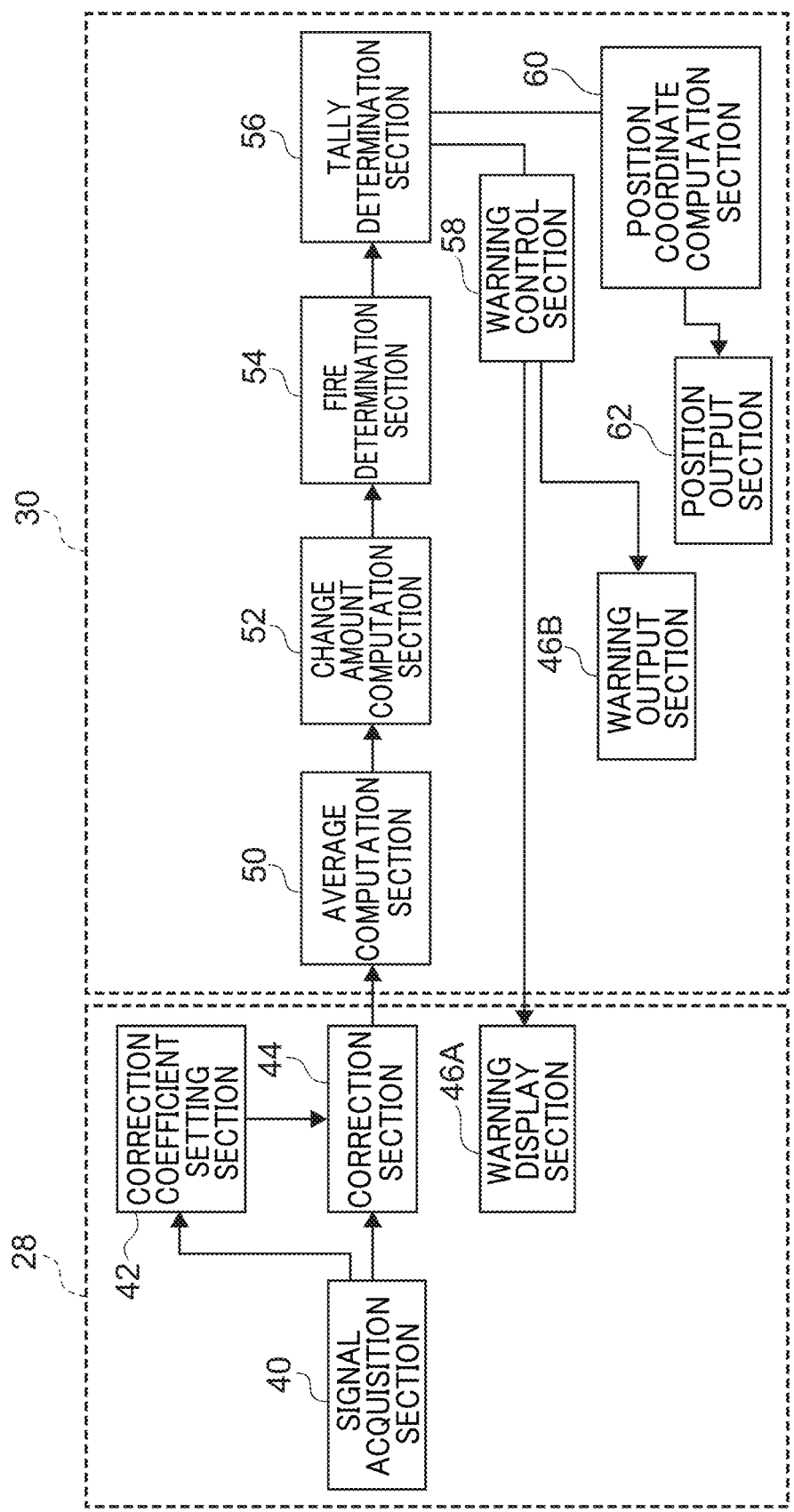
FIG. 2 is a block diagram illustrating configuration of a first arithmetic processing unit and a second arithmetic processing unit of an abnormality detector according to the first exemplary embodiment of the present invention.

The first arithmetic processing unit 28 and the second arithmetic processing unit 30 are each configured by a CPU. When the first arithmetic processing unit 28 and the second arithmetic processing unit 30 are split into functional blocks corresponding to means for implementing respective functionality, as illustrated in FIG. 2, the first arithmetic processing unit 28 includes a signal acquisition section 40, a correction coefficient setting section 42, a correction section 44, and a warning display section 46A. The second arithmetic processing unit 30 includes an average computation section 50, a change amount computation section 52, a fire determination section 54, a tally determination section 56, a warning control section 58, a position coordinate computation section 60, a position output section 62, and a warning output section 46B.

From the signal output from the A/D converter 26, the signal acquisition section 40 acquires electrical signal values from the respective detection elements of the first sensor 12, electrical signal values from the respective detection elements of the second sensor 14, and electrical signal values from the respective detection elements of the third sensor 16.

The correction coefficient setting section 42 pre-sets a correction coefficient to smooth out fluctuations in inter-sensor sensitivity for each of the detection elements of the first sensor 12, each of the detection elements of the second sensor 14, and each of the detection elements of the third sensor 16, a correction coefficient to smooth out fluctuations in sensitivity between individual abnormality detectors 10, and a correction coefficient to perform offset correction. Each of these correction coefficients is set based on the values of respective electrical signals acquired by the signal acquisition section 40 when irradiated with infrared light configuring reference light from a reference light source such as a black body furnace.

The correction section 44 corrects the electrical signal values from the respective detection elements of the first sensor 12, the electrical signal values from the respective detection elements of the second sensor 14, and the electrical signal values from the respective detection elements of the third sensor 16 acquired by the signal acquisition section 40 employing the correction coefficients set by the correction coefficient setting section 42, and outputs the results to the second arithmetic processing unit 30.

Figure 3:
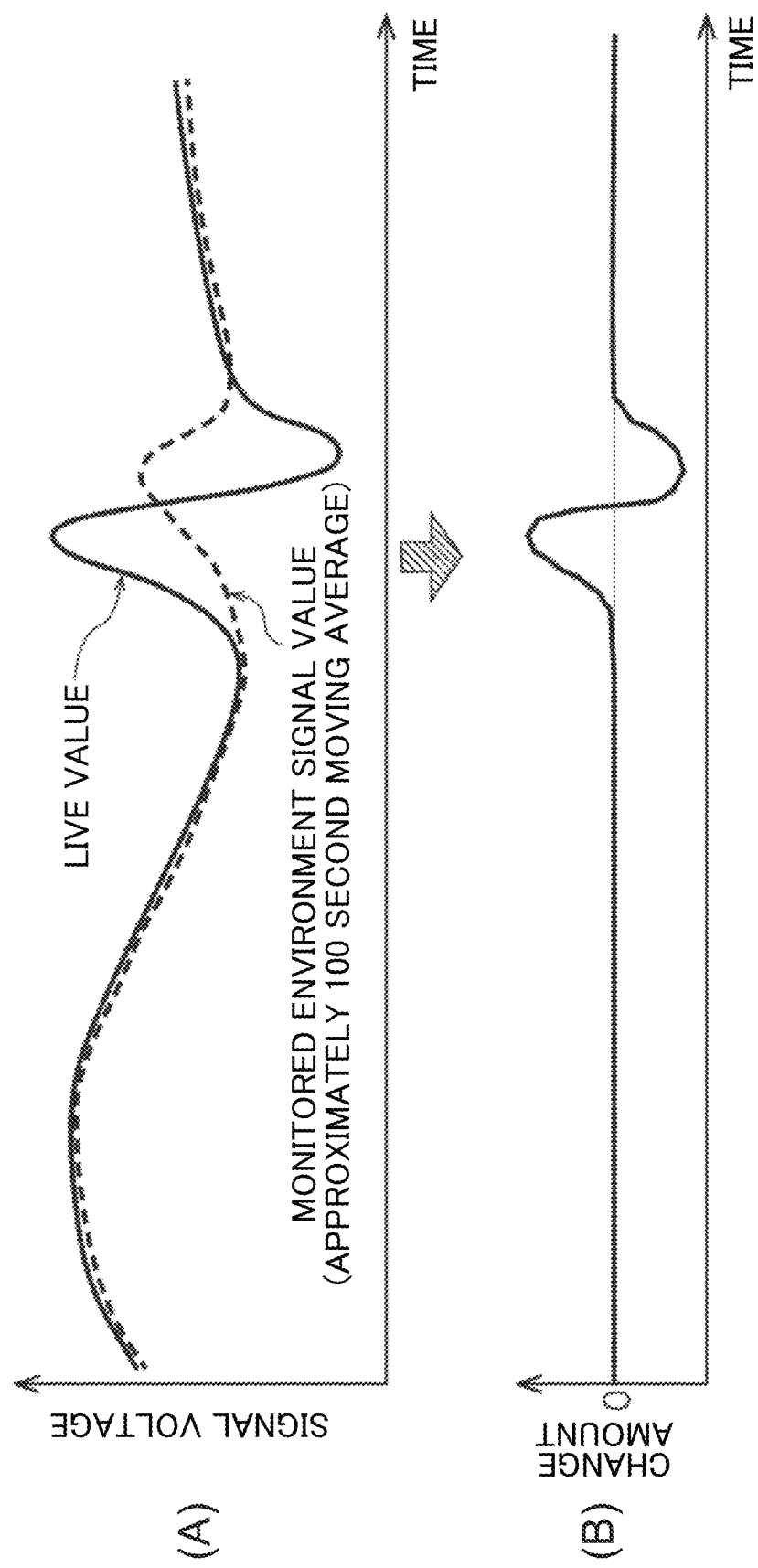
FIG. 3(A) is a diagram illustrating monitored environment signal values and live values.
FIG. 3(B) is a diagram illustrating change amounts.

The average computation section 50 computes for the respective detection elements of the first sensor 12 a moving average value (for example an average value for the preceding 100 seconds) of the electrical signal values from each of the detection elements of the first sensor 12 as corrected by the correction section 44 as a monitored environment signal value of the signals of the detection elements of the first sensor 12 (see FIG. 3A). Similarly, the average computation section 50 computes for the respective detection elements of the second sensor 14 a moving average value of the electrical signal values from each of the detection elements of the second sensor 14 as corrected by the correction section 44 as a monitored environment signal value of the signals of the detection elements of the second sensor 14. The average computation section 50 similarly computes for the respective detection elements of the third sensor 16 a moving average value of the electrical signal values from each of the detection elements of the third sensor 16 as corrected by the correction section 44 as a monitored environment signal value of the signals of the detection elements of the third sensor 16.

For each of the detection elements of the first sensor 12, the change amount computation section 52 computes the difference between a live value of the electrical signal from the detection element as corrected by the correction section 44 and the monitored environment signal value of the signal of the detection element as computed by the average computation section 50 as a first change amount (see FIG. 3B). Similarly, for each of the detection elements of the second sensor 14, the change amount computation section 52 computes the difference between a live value of the electrical signal from the detection element as corrected by the correction section 44 and the monitored environment signal value of the signal of the detection element as computed by the average computation section 50 as a second change amount. For each of the detection elements of the third sensor 16, the change amount computation section 52 similarly computes the difference between a live value of the electrical signal from the detection element as corrected by the correction section 44 and the monitored environment signal value of the signal of the detection element as computed by the average computation section 50 as a third change amount.

Explanation follows regarding the principles of flame detection.

As an example, fire determination is performed according to the following steps (1) to (3) when infrared radiation from a flame is received.

(1) The change amount in a band in the vicinity of 4.0 μm and the change amount in a band in the vicinity of wavelength 5.0 μm are used in a straight line approximation to compute a calculated value for noise amount in a band in the vicinity of wavelength 4.5 μm without considering carbon dioxide gas resonant radiation.

(2) The ratio of the change amount in the band in the vicinity of wavelength 4.5 μm to the noise amount is then computed as a determination ratio.

(3) A threshold value for fire determination is selected by using the noise amount that has been derived as a reference value, and the threshold value is employed as the determination value for fire determination.

Treating the noise amount as a reference value in a threshold value table in this manner produces more reliable product specifications capable of performing fire determination compatible with challenging fire detection scenarios and changes in monitoring target.

Flames are determined to have been detected in cases in which a condition is satisfied of the determination ratio being the threshold value or greater in the band in the vicinity of 4.5 μm. Note that the threshold value table defines a determination ratio threshold value for the first change amount (in the vicinity of 4.5 μm) at each noise amount.

In the present exemplary embodiment, the fire determination section 54 determines whether or not flames have been detected for each of the detection elements of the sensor array 12B by following the principles described above. Specifically, the fire determination section 54 determines that flames have been detected in cases in which at least one out of the value of the first change amount (in the vicinity of 4.5 μm) of a detection element, the value of the second change amount (in the vicinity of 4.0 μm) of the corresponding detection element of the sensor array 14B, or the value of the third change amount (in the vicinity of 5.0 μm) of the corresponding detection element of the sensor array 16B, these values having been computed by the change amount computation section 52, is a threshold value E or greater, in addition to the ratio of the first change amount to the calculated value (noise amount) in the vicinity of 4.5 μm, as obtained from the straight line approximation based on the value of the second change amount and the value of the third change amount, satisfying a predetermined condition when compared against a threshold value.

Note that in cases in which the value of the second change amount is greater than the value of the third change amount, the fire determination section 54 takes the calculated value of the first change amount as the noise amount and acquires a threshold value appropriate to the ratio of the first change amount to the noise amount from the threshold value table to perform determination. On the other hand, in cases in which the value of the second change amount is the value of the third change amount or lower, the fire determination section 54 employs a predetermined threshold value appropriate to the ratio to perform stricter determination. The threshold value appropriate to the ratio employed in stricter determination may, for example, be a threshold value corresponding to cases in which the noise amount is zero.

The above determination by the fire determination section 54 is repeated at a given cycle.

The tally determination section 56 performs the following processing for each of the detection elements of the sensor array 12B.

In cases in which a tally of consecutive determinations that flames have been detected by the fire determination section 54 is a predetermined consecutive tally or greater, or in cases in which the tally of determinations that flames have been detected by the fire determination section 54 within a given duration is a predetermined cumulative tally or greater, the tally determination section 56 takes the moving average value as the fixed value, outputs a fire signal, and also outputs a predetermined position of the corresponding detection element as a fire position. Note that in cases in which plural fire positions are present, the plural fire positions are output.

In the present exemplary embodiment, the threshold values relating to the tallies are modified according to the noise amount and/or the difference between the first change amount and the noise amount, in order to change the fire determination speed before a fire signal is output. For example, the threshold values relating to the tallies are modified such that the threshold values become smaller the greater the noise amount, or the greater the difference between the first change amount and the noise amount, so as to increase the fire determination speed before a fire signal is output.

When a fire signal has been output from the tally determination section 56, the warning control section 58 controls the warning display section 46A and the warning output section 46B so as to notify of the fire position. For example, the warning display section 46A illuminates a red LED, and the warning output section 46B places a photo-coupler in a communicative state to actuate output at a contact point configuring the external output section 32.

The position coordinate computation section 60 computes a position coordinate in real space corresponding to the fire position output from the tally determination section 56. The position output section 62 outputs the position coordinate of the fire position computed by the position coordinate computation section 60 to an external device. The output position coordinate is employed in the external device to perform pinpoint firefighting. When this is performed, pinpoint firefighting may be performed in order of priority in cases in which plural fire positions are present. For example, pinpoint firefighting may be performed in sequence from the largest fire.

Abnormality Detector Operation

Explanation follows regarding operation of the abnormality detector 10 according to the first exemplary embodiment of the present invention.

First, the correction coefficients are set in advance, prior to installation of the abnormality detector 10. Specifically, while the first sensor 12, the second sensor 14, and the third sensor 16 are being irradiated with reference light, i.e. infrared light from a reference light source such as a black body furnace, the correction coefficient setting section 42 of the abnormality detector 10 sets the correction coefficients for each of the detection elements of the first sensor 12, each of the detection elements of the second sensor 14, and each of the detection elements of the third sensor 16.

Figure 4:
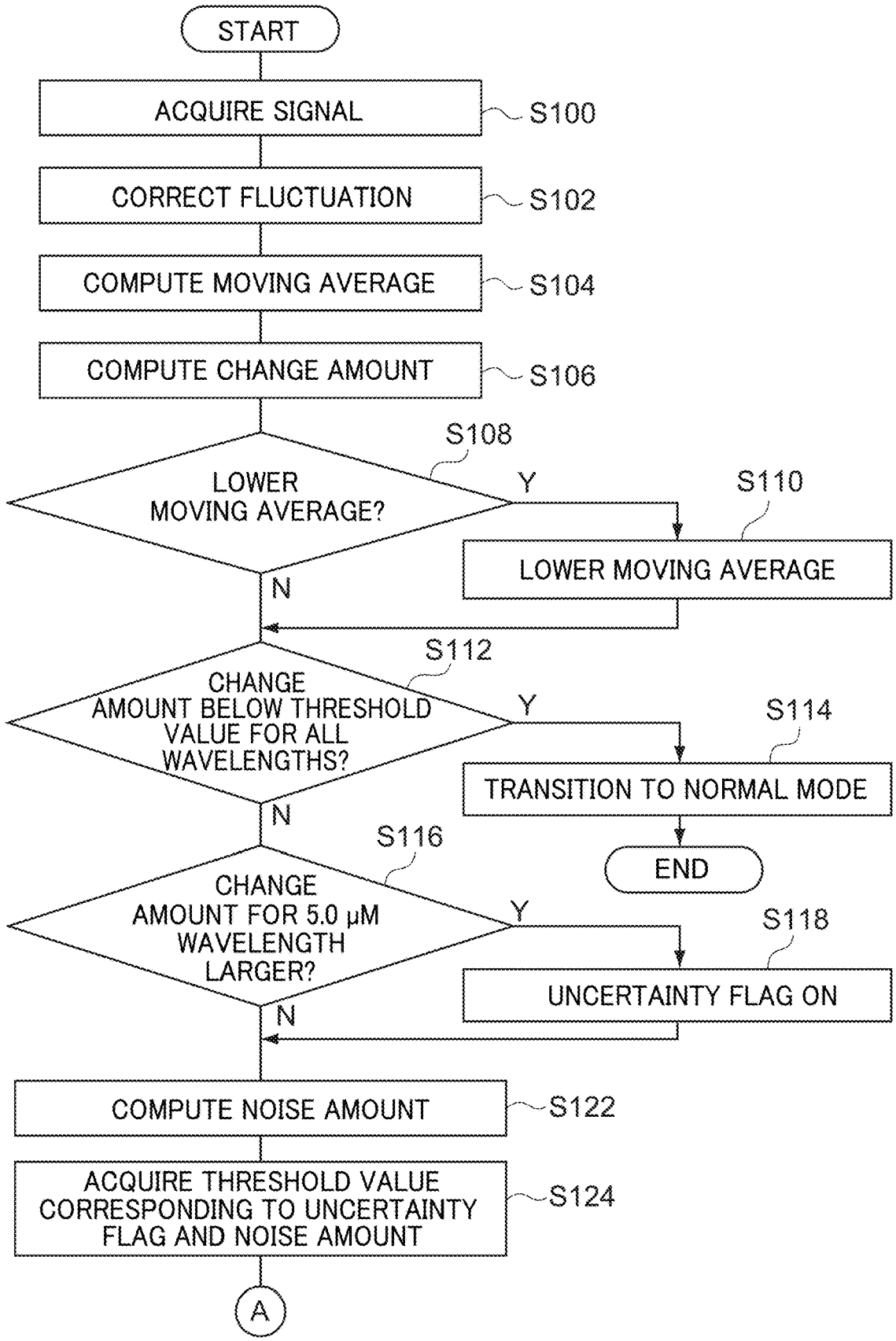
FIG. 4 is a flowchart illustrating a fire determination processing routine performed by a first arithmetic processing unit and a second arithmetic processing unit of an abnormality detector according to the first exemplary embodiment of the present invention.
Figure 5:
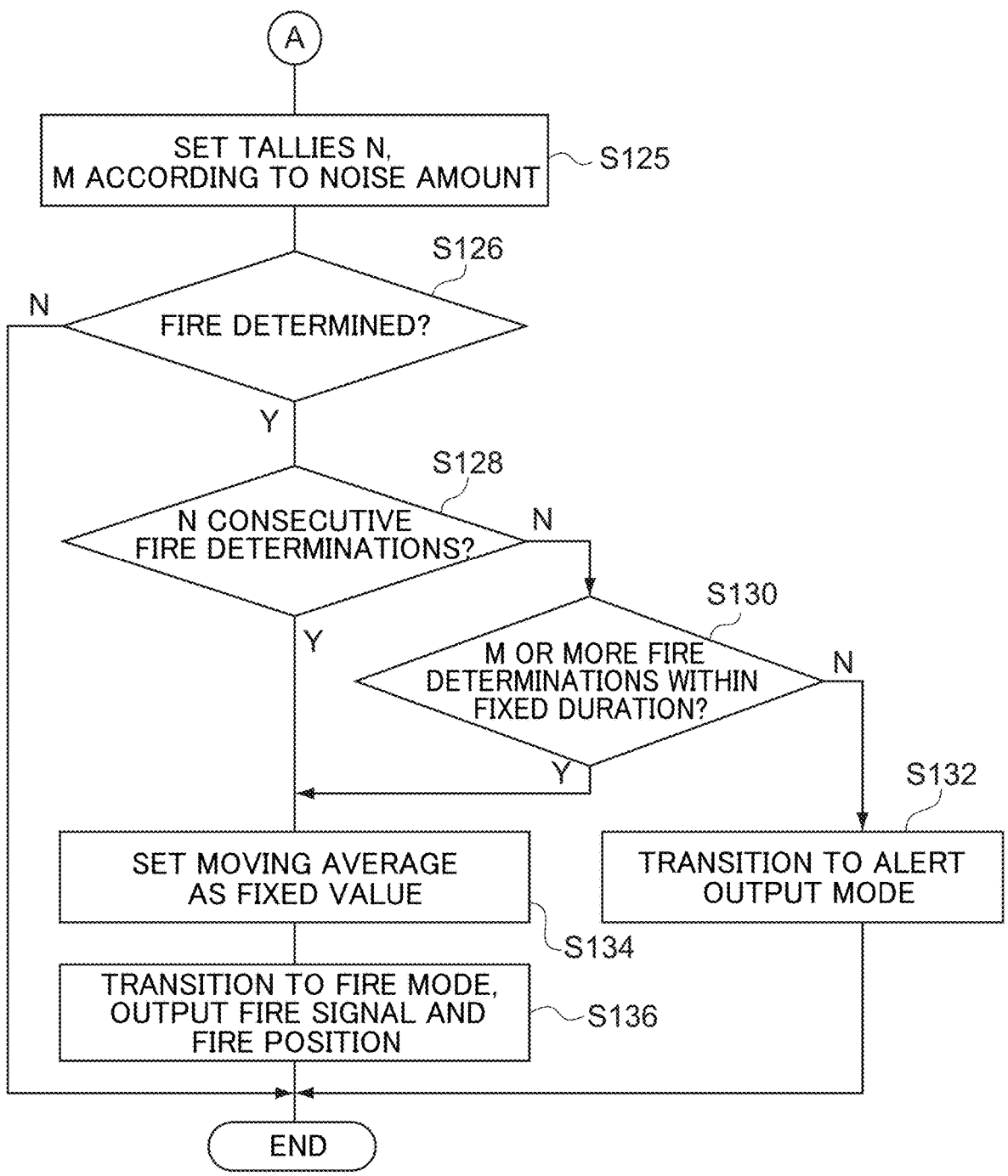
FIG. 5 is a flowchart illustrating a fire determination processing routine performed by a first arithmetic processing unit and a second arithmetic processing unit of an abnormality detector according to the first exemplary embodiment of the present invention.

When the correction coefficients have been set, the abnormality detector 10 is installed at the location where fire determination is required. Each of the detection elements of the first sensor 12, each of the detection elements of the second sensor 14, and each of the detection elements of the third sensor 16 of the abnormality detector 10 output electrical signals, and the values of the respective signals are input to the first arithmetic processing unit 28 via the amplifiers 18, 20, 22, the switch 24, and the A/D converter 26. When this is performed, the first arithmetic processing unit 28 and the second arithmetic processing unit 30 of the abnormality detector 10 repeatedly execute the fire determination processing routine illustrated in FIG. 4 and FIG. 5 at a given cycle. Note that the fire determination processing routine is executed for each of the detection elements of the first sensor 12.

At step S100, the signal acquisition section 40 acquires the electrical signal value from a corresponding detection element of the first sensor 12, the electrical signal value from the corresponding detection element of the second sensor 14, and the electrical signal value from the corresponding detection element of the third sensor 16 from the signal output from the A/D converter 26.

At the next step S102, the correction section 44 corrects the electrical signal value from the corresponding detection element of the first sensor 12, the electrical signal value from the corresponding detection element of the second sensor 14, and the electrical signal value from the corresponding detection element of the third sensor 16 acquired at step S100 using the correction coefficients set in advance.

At step S104, the average computation section 50 computes the moving average values for the electrical signal value from the corresponding detection element of the first sensor 12, the electrical signal value from the corresponding detection element of the second sensor 14, and the electrical signal value from the corresponding detection element of the third sensor 16, based on the sensor values corrected at step S102, and previous sensor values corrected at step S102.

At step S106, the change amount computation section 52 computes the first change amount, the second change amount, and the third change amount for the electrical signal value from the corresponding detection element of the first sensor 12, the electrical signal value from the corresponding detection element of the second sensor 14, and the electrical signal value from the corresponding detection element of the third sensor 16, based on the sensor values corrected at step S102 and the moving average values computed at step S104.

At step S108, the fire determination section 54 determines whether or not to lower the moving average values to predetermined values based on the first change amount, the second change amount, and the third change amount computed at step S106, and previous first change amounts, second change amounts, and third change amounts computed at step S106. In cases in which the values of any one out of the first change amounts, the second change amounts, or the third change amounts have continuously been at a negative reference value or lower for a given duration, determination is made to lower the moving average values. When lowering the moving average values, processing transitions to step S110, and the moving average values are lowered to a predetermined value for each of the electrical signal value from the first sensor 12, the electrical signal value from the second sensor 14, and the electrical signal value from the third sensor 16, employing the sensor values corrected at step S102.

In cases in which the moving average values are not lowered to the predetermined value, processing transitions to step S112.

At step S112, the fire determination section 54 determines whether or not the first change amount, the second change amount, and the third change amount computed at step S106 are all below the predetermined threshold value E. In cases in which the first change amount, the second change amount, and the third change amount are all determined to be below the predetermined threshold value E, if a fire mode or alert output mode is currently active, at step S114, transition is made to a normal mode, and the fire determination processing routine is ended. Note that if the normal mode is currently active, the normal mode is maintained.

In cases in which at least one out of the first change amount, the second change amount, or the third change amount is determined to be the predetermined threshold value E or greater, at step S116, the fire determination section 54 determines whether or not the second change amount is the third change amount or lower. In cases in which the second change amount is the third change amount or lower, at step S118, an uncertainty flag is put in place to indicate the possibility of incorrect flame determination caused by hot air. On the other hand, in cases in which the second change amount is larger than the third change amount, processing transitions to step S122.

At step S122, the fire determination section 54 derives an approximated straight line from the second change amount and the third change amount computed at step S106, and employs the derived approximated straight line to compute a calculated value as the noise amount corresponding to the first change amount.

At step S124, the fire determination section 54 acquires a determination ratio threshold value relating to the first change amount corresponding to the uncertainty flag set at step S118, and/or the noise amount computed at step S122.

Then, at step S125, the fire determination section 54 sets a threshold value N relating to a consecutive tally and a threshold value M relating to a cumulative tally corresponding to the noise amount computed at step S122 and/or the difference between the first change amount and the noise amount.

At the next step S126, the fire determination section 54 computes a determination ratio relating to the first change amount based on the first change amount computed at step S106 and the noise amount computed at step S122, and employs the threshold value acquired at step S124 to determine whether or not the determination ratio relating to the first change amount is the corresponding threshold value or greater. In cases in which the determination ratio relating to the first change amount is below the corresponding threshold value, determination is made that flames have not been detected, and the fire determination processing routine is ended with the current mode maintained.

On the other hand, in cases in which the determination ratio relating to the first change amount is the corresponding threshold value or greater, determination is made that flames have been detected, and processing transitions to step S128.

At step S128, the tally determination section 56 determines whether or not the tally of consecutive determinations that flames have been detected is the predetermined consecutive tally N or greater, based on the determination result of step S126, previous determination results of step S126, and on the threshold value N relating to the consecutive tally set at step S125. In cases in which the tally of consecutive determinations that flames have been detected is the consecutive tally N or greater, determination is made that a fire has occurred, and processing transitions to step S134. In cases in which the tally of consecutive determinations that flames have been detected is below the consecutive tally N, processing transitions to step S130.

At step S130, the tally determination section 56 determines whether or not the tally of determinations that flames have been detected within the given duration is the predetermined cumulative tally M or greater based on the determination result of step S126, previous determination results of step S126, and on the threshold value M relating to the cumulative tally set at step S125. In cases in which the tally of determinations that flames have been detected within the given duration is the cumulative tally M or greater, determination is made that a fire has occurred and processing transitions to step S134. In cases in which the tally of consecutive determinations that flames have been detected is below the cumulative tally M, processing transitions to step S132, transition is made to the alert output mode, and the fire determination processing routine is ended.

At step S134, the tally determination section 56 sets the moving average values of the electrical signal value from the corresponding detection element of the first sensor 12, the electrical signal value of the corresponding detection element of the second sensor 14, and the electrical signal value of the corresponding detection element of the third sensor 16 so as to be fixed to the moving average values for the current point in time. Then, at step S136, the warning control section 58 transitions to the fire mode and outputs a fire signal and the predetermined position of the corresponding detection element as the fire position to the warning display section 46A, the warning output section 46B, and the position coordinate computation section 60, before ending the fire determination processing routine.

As described above, in the abnormality detector according to the above exemplary embodiment of the present invention, infrared light in a band in the vicinity of 4.5 μm corresponding to the carbon dioxide gas resonance radiation band, infrared light in a band in the vicinity of 4.0 μm corresponding to a waveband shorter than the carbon dioxide gas resonance radiation band, and infrared light in a band in the vicinity of 5.0 μm corresponding to a waveband longer than the carbon dioxide gas resonance radiation band are respectively detected and converted into DC component electrical signals by the three sensor arrays. The abnormality detector determines whether or not flames have been detected based on the first change amount, the second change amount, and the third change amount corresponding to change amounts from the moving average value for each of the electrical signals. This eliminates false actuation caused by hot air, enabling precise flame detection at each position.

Moreover, due to employing thermopiles that detect infrared light and convert this into DC component electrical signals, there is no need for frequency resolution processing, enabling speedier detection.

Modified Examples

The present invention is not limited to the exemplary embodiment described above, and various modifications may be implemented within a range not departing from the spirit of the present invention.

For example, although explanation has been given regarding an example in which the abnormality detector performs fire determination for each of the detection elements in the above exemplary embodiment, there is no limitation thereto. The abnormality detector may perform fire determination for individual blocks of the sensor arrays. In such cases, the abnormality detector may perform determination as to whether or not flames have been detected based on electrical signal values detected by respective detection elements of the sensor array 12B included in a block for each block of the sensor array 12B, electrical signal values detected by respective detection elements included in a corresponding block of the sensor array 14B, and electrical signal values detected by respective detection elements included in a corresponding block of the sensor array 16B. Moreover, a predetermined region corresponding to a block in which determination has been made that flames have been detected may be determined to be the position where flames have been detected. Specifically, in such an abnormality detector, an average value of the electrical signal values detected by the respective detection elements included in a given block may be taken as a block value. The average computation section 50 computes a moving average value for the block values of each block of the sensor array 12B, computes a moving average value for the block values of each block of the sensor array 14B, and computes a moving average value for the block values of each block of the sensor array 16B.

Then, for each block of the first sensor 12, the change amount computation section 52 then computes the difference between a live value of that block and the moving average value of that block as the first change amount. Similarly, for each block of the second sensor 14, the change amount computation section 52 computes the difference between a live value of that block and the moving average value of that block as computed by the average computation section 50 as the second change amount. Similarly, for each block of the third sensor 16, the change amount computation section 52 computes the difference between a live value of that block and the moving average value of that block as computed by the average computation section 50 as the third change amount.

Similarly to in the exemplary embodiment described above, the abnormality detector may perform fire determination for each block of the sensor arrays by computing the first change amount, the second change amount, and the third change amount for each of the detection elements. When this is performed, the abnormality detector determines whether or not flames have been detected based on the first change amount, the second change amount, and the third change amount for each of the detection elements, and may determine that flames have been detected in a particular block if the number of detection elements out of the detection elements included in this block that have determined that flames have been detected is a threshold value or greater.

The abnormality detector may also perform fire determination for each sensor array block when performing fire determination for each of the detection elements of the sensor array.

In the exemplary embodiment described above, explanation has been given regarding an example of a case in which the abnormality detector outputs a fire signal either in cases in which the tally of consecutive determinations that flames have been detected by the fire determination section 54 is the predetermined consecutive tally or greater, or in cases in which the tally of determinations that flames have been detected by the fire determination section 54 within a given duration is the predetermined cumulative tally or greater. However, there is no limitation thereto. The abnormality detector may output a fire signal in cases in which both the tally of consecutive determinations that flames have been detected by the fire determination section 54 is the predetermined consecutive tally or greater and the tally of determinations that flames have been detected by the fire determination section 54 within a given duration is the predetermined cumulative tally or greater.

Moreover, explanation has been given regarding an example of a case in which infrared rays in a band in the vicinity of 4.0 µm and infrared rays in a band in the vicinity of 5.0 µm are detected in addition to the band in the vicinity of 4.5 µm, corresponding to the carbon dioxide gas resonance radiation band. However, there is no limitation thereto. Infrared rays may be detected in other bands other than the band in the vicinity of 4.5 µm corresponding to the carbon dioxide gas resonance radiation band, as long as infrared rays are detected in at least two bands that are different from the band in the vicinity of 4.5 µm corresponding to the carbon dioxide gas resonance radiation band. For example, infrared rays may be detected in two or more bands both having a shorter wavelength than the carbon dioxide gas resonance radiation band. Alternatively, infrared rays may be detected in two or more bands both having a longer wavelength than the carbon dioxide gas resonance radiation band. In such cases, the value of the second change amount and the value of the third change amount may be calculated for two bands having a longer wavelength than the carbon dioxide gas resonance radiation band (for example a band in the vicinity of 5.0 µm and a band in the vicinity of 6.0 µm), and a calculated value (noise amount) for the vicinity of 4.5 µm may be calculated from an approximated straight line of the value of the second change amount and the value of the third change amount.

Although explanation has been given regarding an example of a case in which the average computation section 50 computes the moving average value of the electrical signal values from each of the sensors as the monitored environment signal values for the signals of each of the sensors, there is no limitation thereto. The abnormality detector may compute a weighted average value of the electrical signal values from each of the sensors as the monitored environment signal values for the signals of each of the sensors.

Although explanation has been given regarding an example of a case in which threshold values are obtained from a threshold value table in the exemplary embodiment described above, there is no limitation thereto. A function used to derive threshold values may be derived, and threshold values obtained using this function.

Although explanation has been given regarding an example of a case in which the fire determination section 54 determines whether or not the determination ratio of the first change amount to the noise amount is a determination threshold value or greater in order to determine whether or not flames have been detected, there is no limitation thereto. For example, the fire determination section 54 may determine whether or not the difference between the first change amount and the noise amount is a determination threshold value or greater in order to determine whether or not flames have been detected. Alternatively, for example, the fire determination section 54 may determine whether or not the difference between the first change amount and the noise amount is a determination threshold value or greater, and also determine whether or not the determination ratio of the first change amount to the noise amount is a determination threshold value or greater, in order to determine whether or not flames have been detected.

Although explanation has been given regarding of a case in which the first sensor 12, the second sensor 14, and the third sensor 16 all employ sensor arrays, there is no limitation thereto. Configuration may be made in which at least one out of the first sensor 12, the second sensor 14, or the third sensor 16 employs a sensor array. For example, the first sensor 12 may employ the sensor array 12B, whereas the second sensor 14 and the third sensor 16 each employ a single detection element instead of a sensor array. In such cases, when computing the first change amount, the second change amount, and the third change amount for each of the detection elements of the sensor array 12B in order to perform fire determination, a common value computed for the single detection element of the second sensor 14 may be employed as the second change amount, and a common value computed for the single detection element of the third sensor 16 may be employed as the third change amount.

Figure 7:
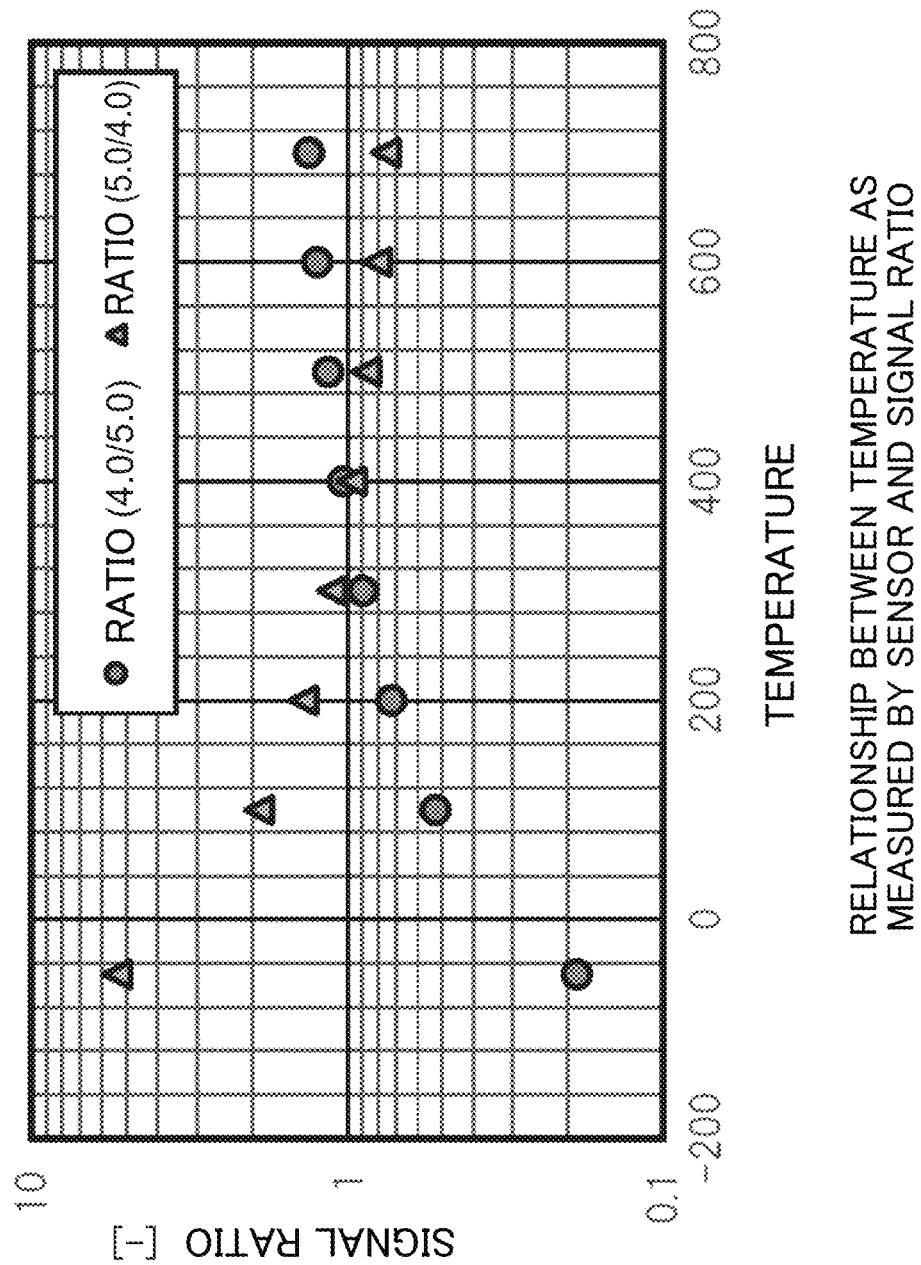
FIG. 7 is a graph illustrating a relationship between temperature and a ratio of a first change amount to a second change amount.

Moreover, abnormal temperatures may be detected instead of flames. In such cases, for the three sensor arrays, infrared light in a band in the vicinity of 4.5 µm corresponding to the carbon dioxide gas resonance radiation band, infrared light in a band in the vicinity of 4.0 µm having a shorter wavelength than the carbon dioxide gas resonance radiation band, and infrared light in a band in the vicinity of 5.0 µm having a longer wavelength than the carbon dioxide gas resonance radiation band are detected and converted into DC component electrical signals. The abnormality detector then determines whether or not an abnormal temperature has been detected for each of the detection elements of the sensor arrays based on a combination of plural out of the first change amount, the second change amount, and the third change amount representing change amounts from the moving average values of the respective electrical signals. For example, as illustrated in FIG. 7, for each of the detection elements of the sensor arrays, the temperature is estimated from the ratio of the second change amount to the third change amount, based on a relationship between temperature and the ratio of the second change amount to the third change amount, and determination is made whether or not an abnormal temperature has been detected. Note that determination as to whether or not an abnormal temperature has been detected may also be made by estimating the temperature based on the ratio of the first change amount to the second change amount, or determination as to whether or not an abnormal temperature has been detected may also be made by estimating the temperature based on the ratio of the first change amount to the third change amount. Alternatively, determination as to whether or not flames have been detected may be made for each of the detection elements of the sensor arrays based on the first change amount, the second change amount, and the third change amount, and determination as to whether or not an abnormal temperature has been detected may be made by estimating the temperature based on a combination of plural out of the first change amount, the second change amount, and the third change amount.

Second Exemplary Embodiment

System Configuration

Explanation follows regarding an abnormality detector according to a second exemplary embodiment of the present invention.

Figure 8:
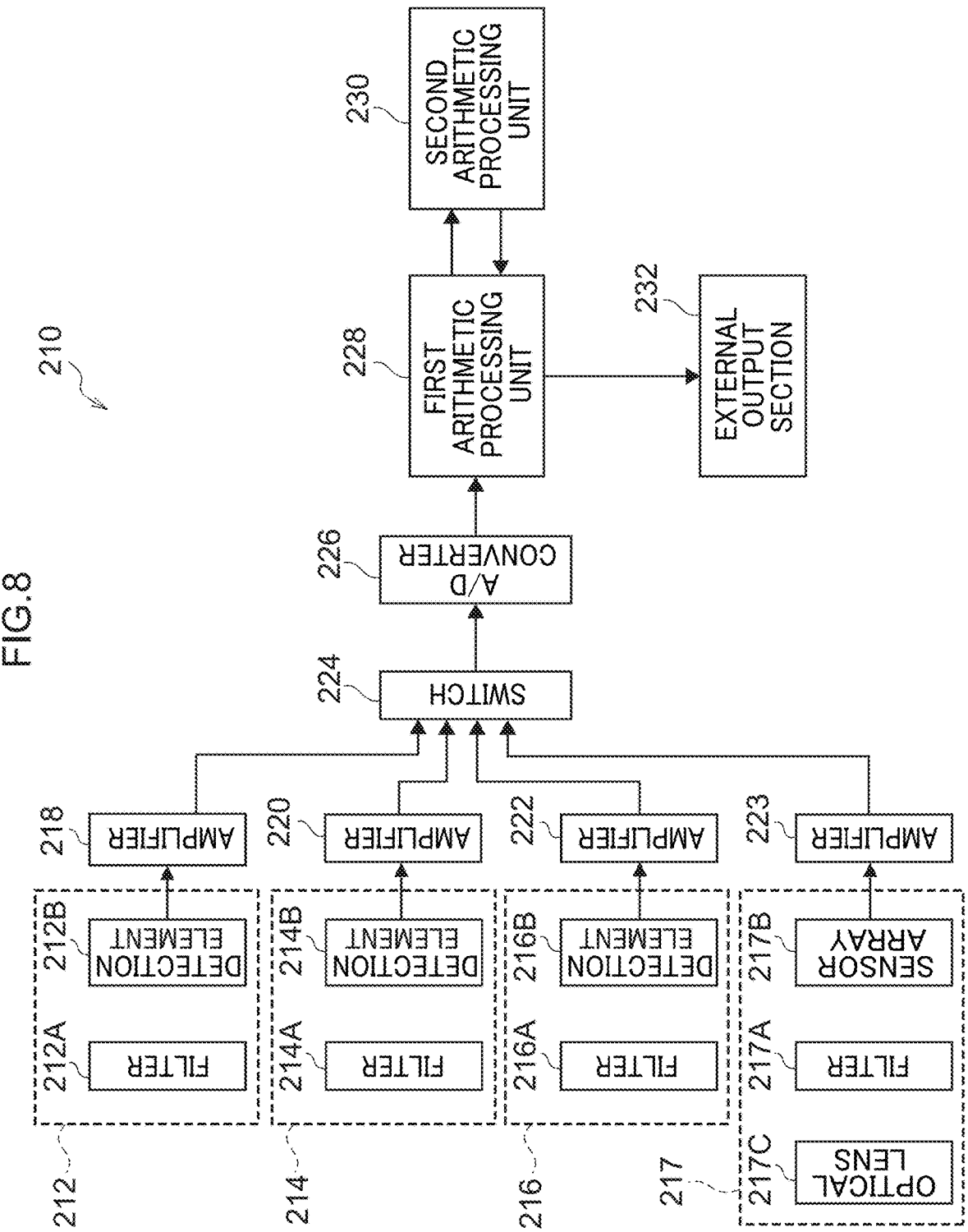
FIG. 8 is a block diagram illustrating configuration of an abnormality detector according to a second exemplary embodiment of the present invention.

As illustrated in FIG. 8, an abnormality detector 210 according to the second exemplary embodiment of the present invention includes a first sensor 212, a second sensor 214, a third sensor 216, and a fourth sensor 217. The first sensor 212 detects infrared light in a band in the vicinity of 4.5 µm corresponding to a carbon dioxide gas resonance radiation band emitted from flames. The second sensor 214 detects infrared light in a band in the vicinity of 4.0 µm corresponding to a waveband shorter than the carbon dioxide gas resonance radiation band. The third sensor 216 detects infrared light in a band in the vicinity of 5.0 µm corresponding to a waveband longer than the carbon dioxide gas resonance radiation band. The fourth sensor 217 detects infrared light in a band from the vicinity of 2.0 µm to the vicinity of 5.0 µm. The abnormality detector 210 further includes an amplifier 218 to amplify a signal from the first sensor 212, an amplifier 220 to amplify a signal from the second sensor 214, an amplifier 222 to amplify a signal from the third sensor 216, an amplifier 223 to amplify a signal from the fourth sensor 217, a switch 224 to amplify signals from the respective amplifiers 218, 220, 222, 223, and an A/D converter 226 configured to convert a signal from the switch 224 to a digital value. The abnormality detector 210 further includes a first arithmetic processing unit 228 to control pre-processing for flame detection and an external output section 232, a second arithmetic processing unit 230 to perform flame detection processing, and the external output section 232.

The first sensor 212 includes a filter 212A that allows the passage of infrared light in a band in the vicinity of 4.5 µm corresponding to the carbon dioxide gas resonance radiation band from flames, and a detection element 212B configured to detect the infrared light that has passed through the filter 212A and convert the infrared light to a DC component electrical signal.

The second sensor 214 includes a filter 214A that allows the passage of infrared light in a band in the vicinity of 4.0 µm corresponding to a waveband shorter than the carbon dioxide gas resonance radiation band, and a detection element 214B configured to detect the infrared light that has passed through the filter 214A and convert the infrared light to a DC component electrical signal.

The third sensor 216 includes a filter 216A that allows the passage of infrared light in a band in the vicinity of 5.0 µm corresponding to a waveband longer than the carbon dioxide gas resonance radiation band, and a detection element 216B configured to detect the infrared light that has passed through the filter 216A and convert the infrared light to a DC component electrical signal.

The fourth sensor 217 includes a filter 217A that allows the passage of infrared light in a band from the vicinity of 2.0 µm to the vicinity of 5.0 µm, a sensor array 217B arrayed in a two-dimensional pattern with detection elements that detect infrared light that has passed through the filter 217A and convert the infrared light into a DC component electrical signal, and an optical lens 217C disposed in front of the filter 217A.

The sensor array 217B detects infrared light at a predetermined monitoring angle (for example 90°), and the detection elements of the sensor array 217B detect infrared light in a predetermined region.

The optical lens 217C is configured by one or more lenses. Note that in order to connect up the focal points on a flat surface as far as possible over a wide monitoring angle of the sensor array 217B, the optical lens 217C is preferably configured by two or more lenses. In order to reduce loss caused by lens reflection, an anti-reflection layer (AR coating) may be vapor-deposited on the lenses to improve the sensitivity of the detection elements. Materials that may be employed for the lenses include sapphire, chalcogenide glass, silicon, germanium, and the like.

Note that sensors that are the same as the first sensor 212 may be further provided in order to reliably capture a weak electrical signal when detecting infrared light in a band in the vicinity of 4.5 µm corresponding to the carbon dioxide gas resonance radiation band. Optical lenses may also be disposed in front of the filters 212A, 214A, and 216A.

Although the detection elements 212B, 214B, 216B and the detection elements of the sensor array 217B are configured by thermopiles, the detection elements may alternatively be configured by other photovoltaic elements such as InAsSb elements or microbolometers, microbolometer elements that employ changes in resistance, or photoconductive elements such as PbSe elements. Note that such other elements detect infrared rays much faster than thermopiles and microbolometers. This enables an abnormality detector capable of very quickly detecting the presence of flames to be configured using the same circuit configuration, due to the higher speed of A/D conversion.

The amplifiers 218, 220, 222, 223 amplify an electric signal of the detection element 212B of the first sensor 212, an electric signal of the detection element 214B of the second sensor 214, an electric signal of the detection element 216B of the third sensor 216, and electric signals of the respective detection elements of the fourth sensor 217 independently of each other.

The switch 224 includes a switching section (not illustrated in the drawings) that switches sequentially through the electrical signals individually amplified by the amplifiers 218, 220, 222, 223 at a given duration so as to be consolidated into a single electrical signal. The single consolidated electrical signal from the switching section is selectively amplified according to the strength of the electrical signal. For example, high gain is employed for amplification when the signal is weak, and low gain is employed when the signal is strong. Alternatively, configuration may be made in which the switch 224 is not provided, and an A/D converter is provided separately for each of the amplifiers 218, 220, 222, 223 such that amplified electrical signals are individually converted into digital values and output to the first arithmetic processing unit 228.

Figure 9:
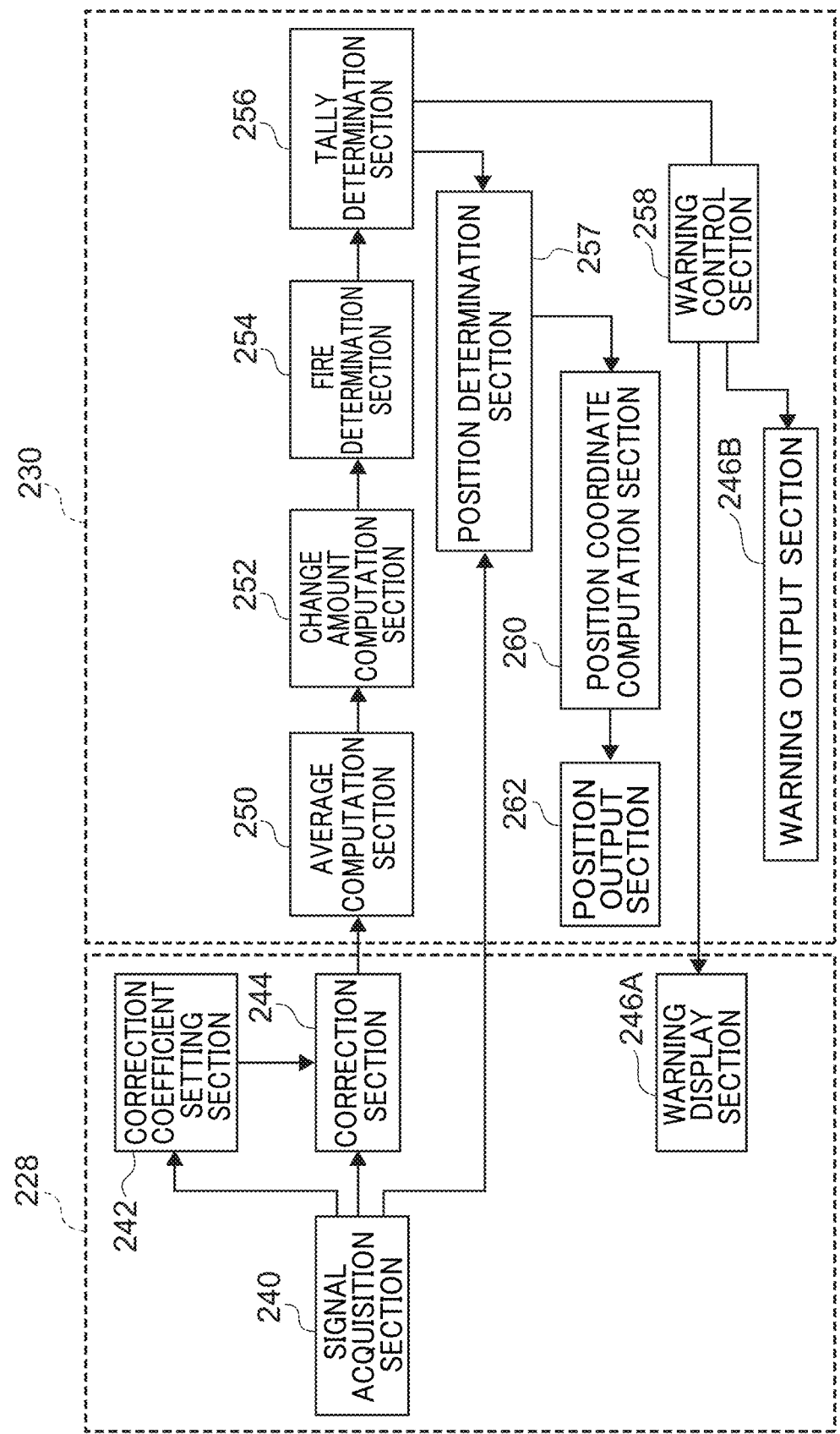
FIG. 9 is a block diagram illustrating configuration of a first arithmetic processing unit and a second arithmetic processing unit of an abnormality detector according to the second exemplary embodiment of the present invention.

The first arithmetic processing unit 228 and the second arithmetic processing unit 230 are each configured by a CPU. When first arithmetic processing unit 228 and the second arithmetic processing unit 230 are split into functional blocks corresponding to means for implementing respective functionality, as illustrated in FIG. 9, the first arithmetic processing unit 228 includes a signal acquisition section 240, a correction coefficient setting section 242, a correction section 244, and a warning display section 246A. The second arithmetic processing unit 230 includes an average computation section 250, a change amount computation section 252, a fire determination section 254, a tally determination section 256, a position determination section 257, a warning control section 258, a position coordinate computation section 260, a position output section 262, and a warning output section 246B.

From the signal output from the A/D converter 226, the signal acquisition section 240 acquires an electrical signal value from the detection element 212B of the first sensor 212, an electrical signal value from the detection element 214B of the second sensor 214, an electrical signal value from the detection element 216B of the third sensor 216, and electrical signal values from the respective detection elements of the fourth sensor 217.

The correction coefficient setting section 242 pre-sets a correction coefficient to smooth out fluctuations in inter-sensor sensitivity for the detection element 212B of the first sensor 212, the detection element 214B of the second sensor 214, and the detection element 216B of the third sensor 216, a correction coefficient to smooth out fluctuations in sensitivity between individual abnormality detectors 210, and a correction coefficient to perform offset correction. Each of these correction coefficients is set based on the values of respective electrical signals acquired by the signal acquisition section 240 when irradiated with infrared light configuring reference light from a reference light source such as a black body furnace.

The correction section 244 corrects the electrical signal value from the detection element 212B of the first sensor 212, the electrical signal value from the detection element 214B of the second sensor 214, and the electrical signal value from the detection element 216B of the third sensor 216 acquired by the signal acquisition section 240 employing the correction coefficients set by the correction coefficient setting section 242, and outputs the results to the second arithmetic processing unit 230.

The average computation section 250 computes for the detection element 212B of the first sensor 12 a moving average value (for example an average value for the preceding 100 seconds) of the electrical signal value from the detection element 212B of the first sensor 212 as corrected by the correction section 244 as a monitored environment signal value of the signal of the detection element 212B (see FIG. 3A). Similarly, the average computation section 250 computes for the detection element 214B of the second sensor 214 a moving average value of the electrical signal value from the detection element 214B of the second sensor 214 as corrected by the correction section 244 as a monitored environment signal value of the signal of the detection element 214B. The average computation section 250 similarly computes for the detection element 216B of the third sensor 216 a moving average value of the electrical signal value from the detection element 216B of the third sensor 216 as corrected by the correction section 244 as a monitored environment signal value of the signal of the detection element 216B.

For the detection element 212B of the first sensor 212, the change amount computation section 252 computes the difference between a live value of the electrical signal from the detection element 212B as corrected by the correction section 244 and the monitored environment signal value of the signal from the detection element 212B as computed by the average computation section 250 as a first change amount (see FIG. 3B). Similarly, for the detection element 214B of the second sensor 214, the change amount computation section 252 computes the difference between a live value of the electrical signal from the detection element 214B as corrected by the correction section 244 and the monitored environment signal value of the signal from the detection element 214B as computed by the average computation section 250 as a second change amount. For the detection element 216B of the third sensor 216, the change amount computation section 252 similarly computes the difference between a live value of the electrical signal from the detection element 216B as corrected by the correction section 244 and the monitored environment signal value of the signal from the detection element 216B as computed by the average computation section 250 as a third change amount.

The fire determination section 254 determines that flames have been detected in cases in which at least one out of the value of the first change amount (in the vicinity of 4.5 μm) for the detection element 212B, the value of the second change amount (in the vicinity of 4.0 μm) for the detection element 214B, or the value of the third change amount (in the vicinity of 5.0 μm) for the detection element 216B as computed by the change amount computation section 252 is a threshold value E or greater, and the ratio of the first change amount to the calculated value (noise amount) in the vicinity of 4.5 μm, as obtained from the approximated straight line based on the value of the second change amount and the value of the third change amount, satisfies a predetermined condition when compared against a threshold value.

Note that in cases in which the value of the second change amount is greater than the value of the third change amount, the fire determination section 254 takes the calculated value of the first change amount as the noise amount and acquires a threshold value appropriate to the ratio of the first change amount to the noise amount from the threshold value table to perform determination. On the other hand, in cases in which the value of the second change amount is the value of the third change amount or lower, the fire determination section 254 employs a predetermined threshold value appropriate to the ratio to perform stricter determination. The threshold value appropriate to the ratio employed in stricter determination may, for example, be a threshold value corresponding to cases in which the noise amount is zero.

The above determination by the fire determination section 254 is repeated at a given cycle.

In cases in which a tally of consecutive determinations that flames have been detected by the fire determination section 254 is a predetermined consecutive tally or greater, or in cases in which the tally of determinations that flames have been detected by the fire determination section 254 within a given duration is a predetermined cumulative tally or greater, the tally determination section 256 takes the moving average value as the fixed value, and outputs a fire signal.

In cases in which the tally of consecutive determinations that flames have been detected by the fire determination section 254 is the predetermined consecutive tally or greater, or in cases in which the tally of determinations that flames have been detected by the fire determination section 254 within the given duration is the predetermined cumulative tally or greater, the position determination section 257 determines a predetermined position of the detection element having the largest electrical signal value to be the fire position based on the electrical signal values detected by the respective detection elements of the sensor array 217B, and outputs this fire position. Note that in cases in which plural fire positions are present, the plural fire positions are output.

In the present exemplary embodiment, the threshold values relating to the tallies are modified according to the noise amount and/or the difference between the first change amount and the noise amount, in order to change the fire determination speed before a fire signal is output. For example, the threshold values relating to the tallies are modified such that the threshold values become smaller the greater the noise amount, or the greater the difference between the first change amount and the noise amount, so as to increase the fire determination speed before a fire signal is output.

When a fire signal has been output from the tally determination section 256, the warning control section 258 controls the warning display section 246A and the warning output section 246B to notify of the fire position. For example, the warning display section 246A illuminates a red LED, and the warning output section 246B places a photocoupler in a communicative state to actuate output at a contact point configuring the external output section 232.

The position coordinate computation section 260 computes a position coordinate in real space corresponding to the fire position output from the position determination section 257. The position output section 262 outputs the position coordinate of the fire position computed by the position coordinate computation section 260 to an external device. The output position coordinate is employed in the external device to perform pinpoint firefighting. When this is performed, pinpoint firefighting may be performed in order of priority in cases in which plural fire positions are present. For example, pinpoint firefighting may be performed in sequence from the largest fire.

Abnormality Detector Operation

Explanation follows regarding operation of the abnormality detector 210 according to the second exemplary embodiment of the present invention.

First, the correction coefficients are set in advance, prior to installation of the abnormality detector 210. Specifically, while the first sensor 212, the second sensor 214, and the third sensor 216 are being irradiated with reference light, i.e. infrared light from a reference light source such as a black body furnace, the correction coefficient setting section 242 of the abnormality detector 210 sets the correction coefficients for the detection element 212B of the first sensor 212, the detection element 214B of the second sensor 214, and the detection element 216B of the third sensor 216.

Figure 10:
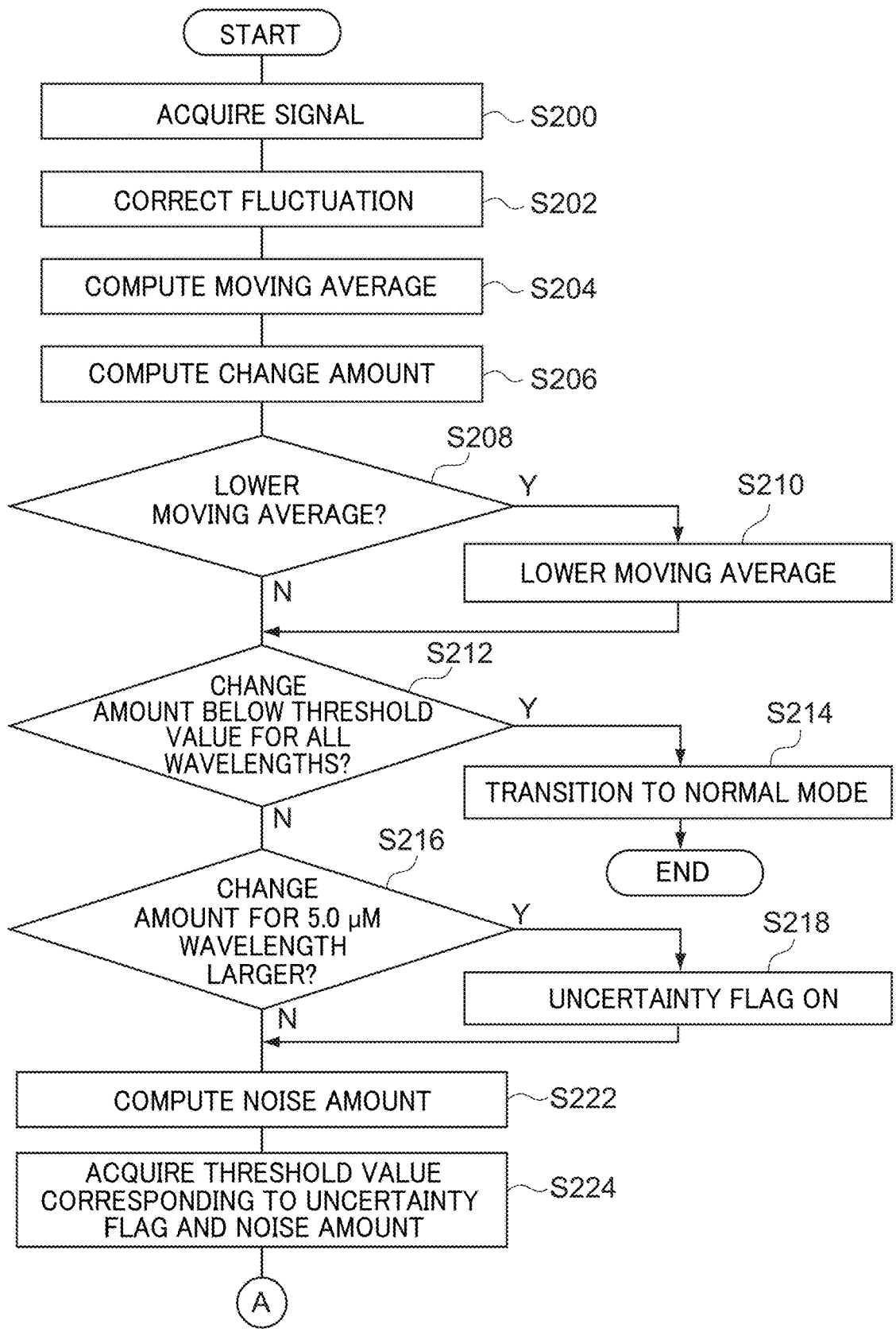
FIG. 10 is a flowchart illustrating a fire determination processing routine performed by a first arithmetic processing unit and a second arithmetic processing unit of an abnormality detector according to the second exemplary embodiment of the present invention.
Figure 11:
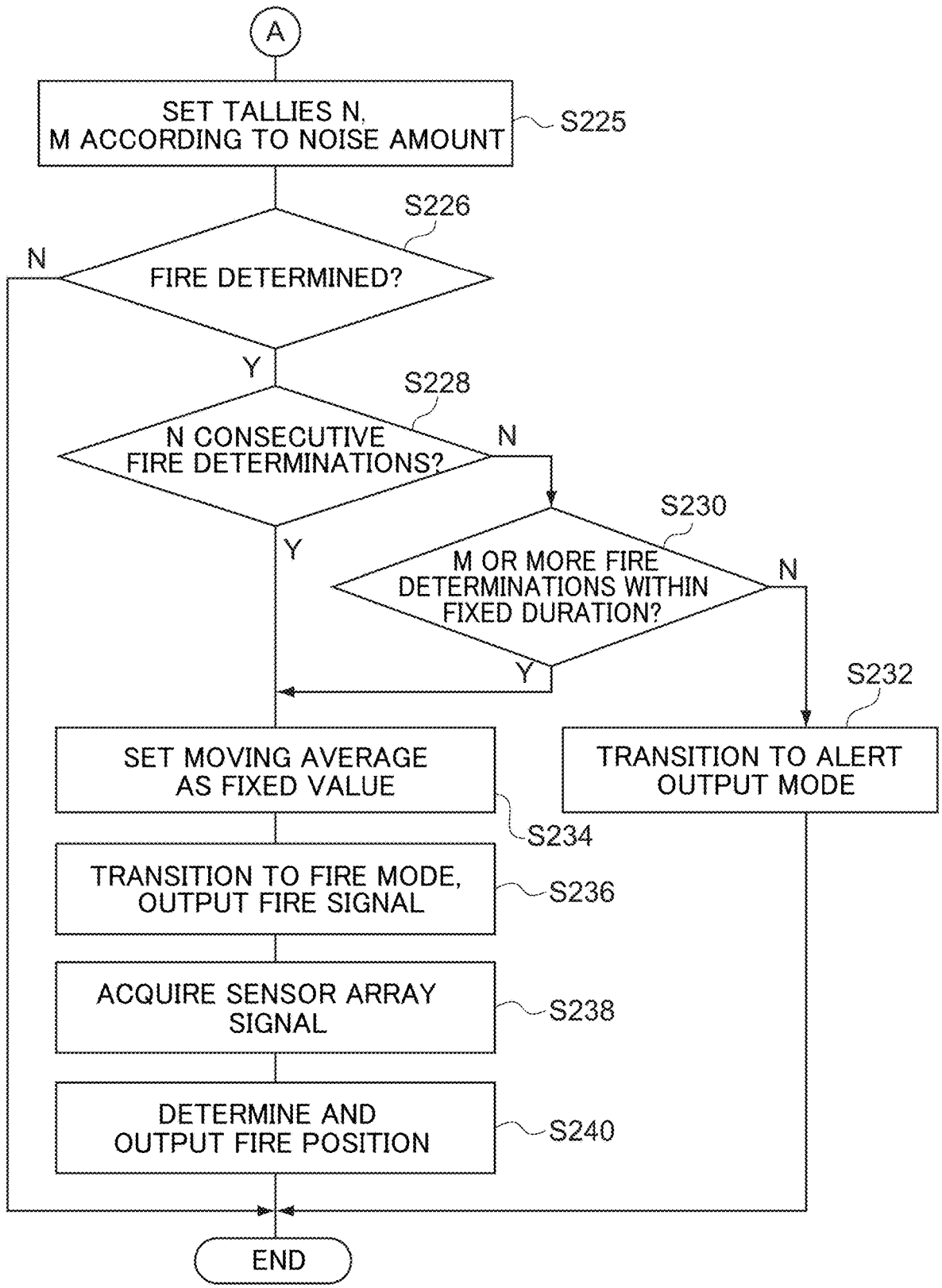
FIG. 11 is a flowchart illustrating a fire determination processing routine performed by a first arithmetic processing unit and a second arithmetic processing unit of an abnormality detector according to the second exemplary embodiment of the present invention.

When the correction coefficients have been set, the abnormality detector 210 is installed at the location where fire determination is required. The detection element 212B of the first sensor 212, the detection element 214B of the second sensor 214, the detection element 216B of the third sensor 216, and the respective detection elements of the fourth sensor 217 of the abnormality detector 210 output electrical signals, and the values of the respective signals are input to the first arithmetic processing unit 228 via the amplifiers 218, 220, 222, 223, the switch 224, and the A/D converter 226. When this is performed, the first arithmetic processing unit 228 and the second arithmetic processing unit 230 of the abnormality detector 210 repeatedly execute the fire determination processing routine illustrated in FIG. 10 and FIG. 11 at a given cycle.

At step S200, the signal acquisition section 240 acquires the electrical signal value from the detection element 212B of the first sensor 212, the electrical signal value from the detection element 214B of the second sensor 214, and the electrical signal value from the detection element 216B of the third sensor 216 from the signal output from the A/D converter 226.

At the next step S202, the correction section 244 corrects the electrical signal value from the detection element 212B of the first sensor 212, the electrical signal value from the detection element 214B of the second sensor 214, and the electrical signal value from the detection element 216B of the third sensor 216 acquired at step S200 using the correction coefficients set in advance.

At step S204, the average computation section 250 computes the moving average values for the electrical signal value from the detection element 212B of the first sensor 212, the electrical signal value from the detection element 214B of the second sensor 214, and the electrical signal value from the detection element 216B of the third sensor 216, based on the sensor values corrected at step S202, and previous sensor values corrected at step S202.

At step S206, the change amount computation section 252 computes the first change amount, the second change amount, and the third change amount for the electrical signal value from the detection element 212B of the first sensor 212, the electrical signal value from the detection element 214B of the second sensor 214, and the electrical signal value from the detection element 216B of the third sensor 216, based on the sensor values corrected at step S202 and the moving average values computed at step S204.

At step S208, the fire determination section 254 determines whether or not to lower the moving average values to predetermined values based on the first change amount, the second change amount, and the third change amount computed at step S206, and previous first change amounts, second change amounts, and third change amounts computed at step S206. For example, in cases in which the values of any one out of the first change amounts, the second change amounts, or the third change amounts have continuously been at a negative reference value or lower for a given duration, determination is made to lower the moving average values to predetermined values. When lowering the moving average values to the predetermined values, processing transitions to step S210, and the moving average values are lowered to the predetermined values for the electrical signal value from the first sensor 212, the electrical signal value from the second sensor 214, and the electrical signal value from the third sensor 216, employing the sensor values corrected at step S202.

In cases in which the moving average values are not lowered to the predetermined values, processing transitions to step S212.

At step S212, the fire determination section 254 determines whether or not the first change amount, the second change amount, and the third change amount computed at step S206 are all below the predetermined threshold value E. In cases in which the first change amount, the second change amount, and the third change amount are all determined to be below the predetermined threshold value E, if a fire mode or alert output mode is currently active, at step S214, transition is made to a normal mode, and the fire determination processing routine is ended. Note that if the normal mode is currently active, the normal mode is maintained.

In cases in which at least one out of the first change amount, the second change amount, or the third change amount is determined to be the predetermined threshold value E or greater, at step S216, the fire determination section 254 determines whether or not the second change amount is the third change amount or lower. In cases in which the second change amount is the third change amount or lower, at step S218, an uncertainty flag is put in place to indicate the possibility of incorrect flame determination caused by hot air. On the other hand, in cases in which the second change amount is larger than the third change amount, processing transitions to step S222.

At step S222, the fire determination section 254 derives an approximated straight line from the second change amount and the third change amount computed at step S206, and employs the derived approximated straight line to compute a calculated value as the noise amount corresponding to the first change amount.

At step S224, the fire determination section 254 acquires a determination ratio threshold value relating to the first change amount corresponding to the uncertainty flag set at step S218, and/or the noise amount computed at step S222.

At step S225, the fire determination section 254 sets a threshold value N relating to a consecutive tally and a threshold value M relating to a cumulative tally according to the noise amount computed at step S222 and/or the difference between the first change amount and the noise amount.

At the next step S226, the fire determination section 254 computes a determination ratio relating to the first change amount based on the first change amount computed at step S206 and the noise amount computed at step S222, and employs the threshold value acquired at step S224 to determine whether or not the determination ratio relating to the first change amount is the corresponding threshold value or greater. In cases in which the determination ratio relating to the first change amount is below the corresponding threshold value, determination is made that flames have not been detected, and the fire determination processing routine is ended with the current mode maintained.

On the other hand, in cases in which the determination ratio relating to the first change amount is the corresponding threshold value or greater, determination is made that flames have been detected, and processing transitions to step S228.

At step S228, the tally determination section 256 determines whether or not the tally of consecutive determinations that flames have been detected is the predetermined consecutive tally N or greater, based on the determination result of step S226, previous determination results of step S226, and on the threshold value N relating to the consecutive tally set at step S225. In cases in which the tally of consecutive determinations that flames have been detected is the consecutive tally N or greater, determination is made that a fire has occurred, and processing transitions to step S234. In cases in which the tally of consecutive determinations that flames have been detected is below the consecutive tally N, processing transitions to step S230.

At step S230, the tally determination section 256 determines whether or not the tally of determinations that flames have been detected within the given duration is the predetermined cumulative tally M or greater based on the determination result of step S226, previous determination results of step S226, and on the threshold value M relating to the cumulative tally set at step S225. In cases in which the tally of determinations that flames have been detected within the given duration is the cumulative tally M or greater, determination is made that a fire has occurred and processing transitions to step S234. In cases in which the tally of consecutive determinations that flames have been detected is below the cumulative tally M, processing transitions to step S232, transition is made to the alert output mode, and the fire determination processing routine is ended.

At step S234, the tally determination section 256 sets the moving average values of the electrical signal value from the detection element 212B of the first sensor 212, the electrical signal value from the detection element 214B of the second sensor 214, and the electrical signal value from the detection element 216B of the third sensor 216 so as to be fixed to the moving average values for the current point in time. Then, at step S236, the warning control section 258 transitions to the fire mode and outputs a fire signal to the warning display section 246A and the warning output section 246B.

At step S238, the signal acquisition section 240 acquires the electrical signal values of each of the detection elements of the fourth sensor 217 from the signal output from the A/D converter 226.

Then, at step S240, based on the electrical signal values detected by the respective detection elements of the fourth sensor 217, the predetermined position of the detection element of the fourth sensor 217 having the largest electrical signal value is determined to be the fire position. This predetermined position is output to the position coordinate computation section 260, and the fire determination processing routine is ended.

As described above, in the abnormality detector according to the second exemplary embodiment of the present invention, infrared light in a band in the vicinity of 4.5 μm corresponding to the carbon dioxide gas resonance radiation band, infrared light in a band in the vicinity of 4.0 μm corresponding to a waveband shorter than the carbon dioxide gas resonance radiation band, and infrared light in a band in the vicinity of 5.0 μm corresponding to a waveband longer than the carbon dioxide gas resonance radiation band are respectively detected and converted into DC component electrical signals. The abnormality detector determines whether or not flames have been detected based on the first change amount, the second change amount, and the third change amount corresponding to change amounts from the moving average value for each of the electrical signals. This eliminates false actuation caused by hot air, enabling precise flame detection. Moreover, the position where flames have been detected can be determined based on the electrical signal values detected by the respective detection elements of the sensor array.

Moreover, due to employing thermopiles that detect infrared light and convert this into DC component electrical signals, there is no need for frequency resolution processing, enabling speedier detection.

Modified Examples

The present invention is not limited to the exemplary embodiment described above, and various modifications may be implemented within a range not departing from the spirit of the present invention.

For example, although explanation has been given regarding an example of a case in which the fire position is determined based on the electrical signal values detected by each of the detection elements of the sensor array 217B in the exemplary embodiment described above, there is no limitation thereto. The average computation section 250 may compute a moving average value for the electrical signal values detected by each of the detection elements of the sensor array 217B, similarly to for the electrical signal value from the detection element 212B of the first sensor 212, the electrical signal value from the detection element 214B of the second sensor 214, and the electrical signal value from the detection element 216B of the third sensor 216. Moreover, the change amount computation section 252 may compute a change amount in the live value with respect to the moving average value for each of the detection elements of the sensor array 217B, and determine the fire position based on the change amounts in the electrical signal values detected by the respective detection elements of the sensor array 217B. In such cases, the predetermined position of the detection element having the change amount with the greatest value may be determined to be the fire position.

Although explanation has been given regarding an example of a case in which the abnormality detector determines the fire position based on the electrical signal values detected by the respective detection elements of the sensor array 217B in the exemplary embodiment described above, there is no limitation thereto. The abnormality detector may determine the fire position based on the electrical signal values for individual blocks of the sensor array 217B. In such cases, an average value of the electrical signal values detected by the respective detection elements included in each block of the sensor array 217B may be taken as a value for the corresponding block. The abnormality detector may then determine a predetermined region corresponding to the block having the greatest block value as the fire position.

The abnormality detector may determine the fire position for each of the detection elements of the sensor array, and also determine the fire position for each block of the sensor array.

Moreover, in the exemplary embodiment described above, explanation has been given regarding an example of a case in which a fire signal is output either in cases in which the tally of consecutive determinations that flames have been detected by the fire determination section 254 is the predetermined consecutive tally or greater, or in cases in which the tally of determinations that flames have been detected by the fire determination section 254 within a given duration is the predetermined cumulative tally or greater. However, there is no limitation thereto. A fire signal may be output in cases in which both the tally of consecutive determinations that flames have been detected by the fire determination section 254 is the predetermined consecutive tally or greater, and the tally of determinations that flames have been detected by the fire determination section 54 within a given duration is the predetermined cumulative tally or greater.

Although explanation has been given regarding an example of a case in which infrared rays in a band in the vicinity of 4.0 μm and infrared rays in a band in the vicinity of 5.0 μm are detected in addition to infrared rays in a band in the vicinity of 4.5 μm corresponding to the carbon dioxide gas resonance radiation band, there is no limitation thereto. Infrared rays in other bands may be detected as long as they include infrared rays in two or more bands that are different to the band in the vicinity of 4.5 μm corresponding to the carbon dioxide gas resonance radiation band in addition to the band in the vicinity of 4.5 μm corresponding to the carbon dioxide gas resonance radiation band. For example, infrared rays may be detected in two or more bands that are wavebands shorter than the carbon dioxide gas resonance radiation band.

Alternatively, infrared rays may be detected in two or more bands that are wavebands longer than the carbon dioxide gas resonance radiation band. In such cases, for two bands that are wavebands longer than the carbon dioxide gas resonance radiation band (for example bands in the vicinity of 5.0 μm and in the vicinity of 6.0 μm), the value of the second change amount and the value of the third change amount may be calculated, and a calculated value (noise amount) in the vicinity of 4.5 μm as obtained from straight line approximation may be calculated based on the value of the second change amount and the value of the third change amount.

Although explanation has been given regarding an example of a case in which the average computation section 250 computes a moving average value of the electrical signal value from each of the sensors as the monitored environment signal value of the signal of each of the sensors, there is no limitation thereto. The average computation section 250 may compute a weighted average value of the electrical signal value from each of the sensors as the monitored environment signal value of the signal of each of the sensors.

Although explanation has been given regarding an example of a case in which threshold values are acquired from a threshold value table in the exemplary embodiment described above, there is no limitation thereto. Functions for deriving threshold values may be derived in advance, and threshold values acquired using these functions.

Although explanation has been given regarding an example of a case in which the fire determination section 254 determines whether or not the determination ratio of the first change amount to the noise amount is the determination threshold value or greater to determine whether or not flames have been detected, there is no limitation thereto. For example, the fire determination section 254 may determine whether or not the difference between the first change amount and the noise amount is a determination threshold value or greater in order to determine whether or not flames have been detected. Alternatively, for example, the fire determination section 254 may determine whether or not the difference between the first change amount and the noise amount is a determination threshold value or greater and also determine whether or not a determination ratio of the first change amount to the noise amount is a determination threshold value or greater in order to determine whether or not flames have been detected.

Although explanation has been given regarding an example of a case in which the filter 217A corresponding to sensor array 217B allows the passage of infrared rays in a band from the vicinity of 2.0 μm to the vicinity of 5.0 μm, there is no limitation thereto, and a filter may be employed that allows the passage of infrared rays in part of a band from the vicinity of 2.0 μm to the vicinity of 5.0 μm.

Moreover, abnormal temperatures may be detected instead of flames. In such cases, infrared light in a band in the vicinity of 4.5 μm corresponding to the carbon dioxide gas resonance radiation band, infrared light in a band in the vicinity of 4.0 μm having a shorter wavelength than the carbon dioxide gas resonance radiation band, and infrared light in a band in the vicinity of 5.0 μm having a longer wavelength than the carbon dioxide gas resonance radiation band are detected and converted into DC component electrical signals. The abnormality detector then determines whether or not an abnormal temperature has been detected based on a combination of plural out of the first change amount, the second change amount, and the third change amount representing change amounts from the moving average values of the respective electrical signals. For example, as illustrated in FIG. 7, the temperature is estimated from the ratio of the second change amount to the third change amount based on a relationship between temperature and the ratio of the second change amount to the third change amount in order to determine whether or not an abnormal temperature has been detected. Note that determination as to whether or not an abnormal temperature has been detected may also be made by estimating the temperature based on the ratio of the first change amount to the second change amount, or determination as to whether or not an abnormal temperature has been detected may be made by estimating the temperature based on the ratio of the first change amount to the third change amount. Alternatively, determination as to whether or not flames have been detected may be made based on the first change amount, the second change amount, and the third change amount, and determination as to whether or not an abnormal temperature has been detected may be made by estimating the temperature based on a combination of plural out of the first change amount, the second change amount, and the third change amount.

Third Exemplary Embodiment

Outline of Third Exemplary Embodiment

A third exemplary embodiment is additionally provided with abnormality detector testing functionality and monitoring window dirt detection functionality. A feature of this exemplary embodiment of the present invention is that a window contamination level is tested employing natural light instead of provided a testing light source to detect the window contamination level, and an abnormal state of the optical system is tested for. Employing natural light enables a conventional testing light source to be eliminated, thereby enabling not only greater degrees of freedom for casing design, but also cutting power consumption and cutting costs. Moreover, a more reassuring monitoring environment can be achieved since there is no time in which a light source is illuminated or flashing during testing.

Figure 12:
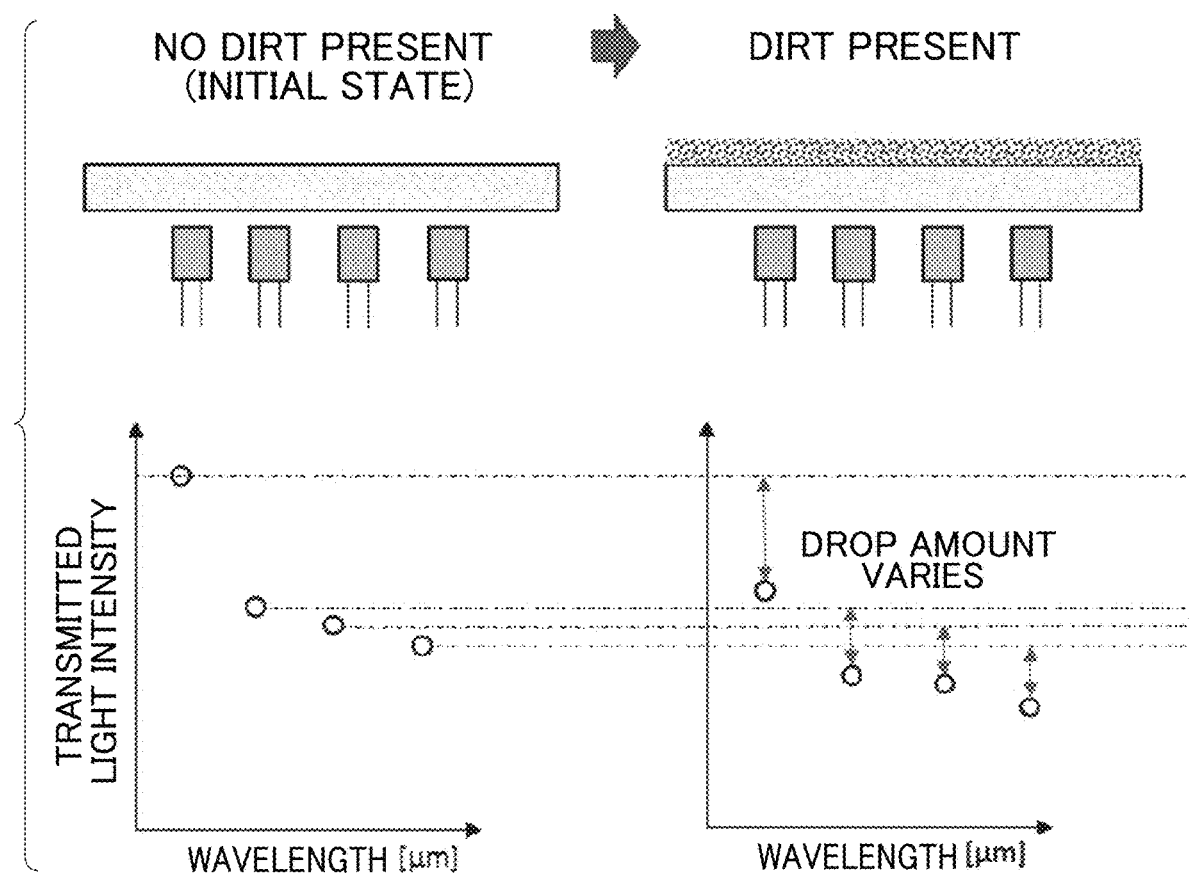
FIG. 12 is a diagram illustrating a relationship between transmitted light intensity and wavelength in a case in which no dirt is present and a case in which dirt is present.

The minimum configuration requirements of the abnormality detector testing functionality and monitoring window dirt detection functionality of this exemplary embodiment of the present invention are at least a monitoring window to allow natural light in from the exterior, and at least two types of detection element for differing wavelength regions. In the abnormality detector, out of natural light 1, 2 corresponding to the wavelength regions of the two types of detection element, light (transmitted light 1, 2) that has passed through the monitoring window is detected by the respective detection elements. In cases in which dirt has adhered to the monitoring window, the natural light 1, 2 is partially absorbed by the dirt, causing the intensities of the transmitted light 1, 2 to attenuate. When this occurs, a difference arises between the attenuation rates of the natural light 1 and the natural light 2 depending on the wavelength region (FIG. 12). Since the amount of the natural light changes as a result of various external factors, the intensity of the transmitted light 1, 2 fluctuates accordingly. Computing a ratio of the intensities of the transmitted light 1, 2, and determining the level of dirt based on the size of this ratio thereby enables an amount dirt to be determined irrespective of the light amount. Note that detection elements employed for the original purpose of the abnormality detector may double as the detection elements for window dirt detection that are the configuration requirements of the abnormality detector testing functionality and the monitoring window dirt detection functionality.

System Configuration

Explanation follows regarding the abnormality detector according to the third exemplary embodiment of the present invention. Note that sections configured similarly to in the first exemplary embodiment are allocated the same reference numerals, and explanation thereof is omitted.

Figure 13:
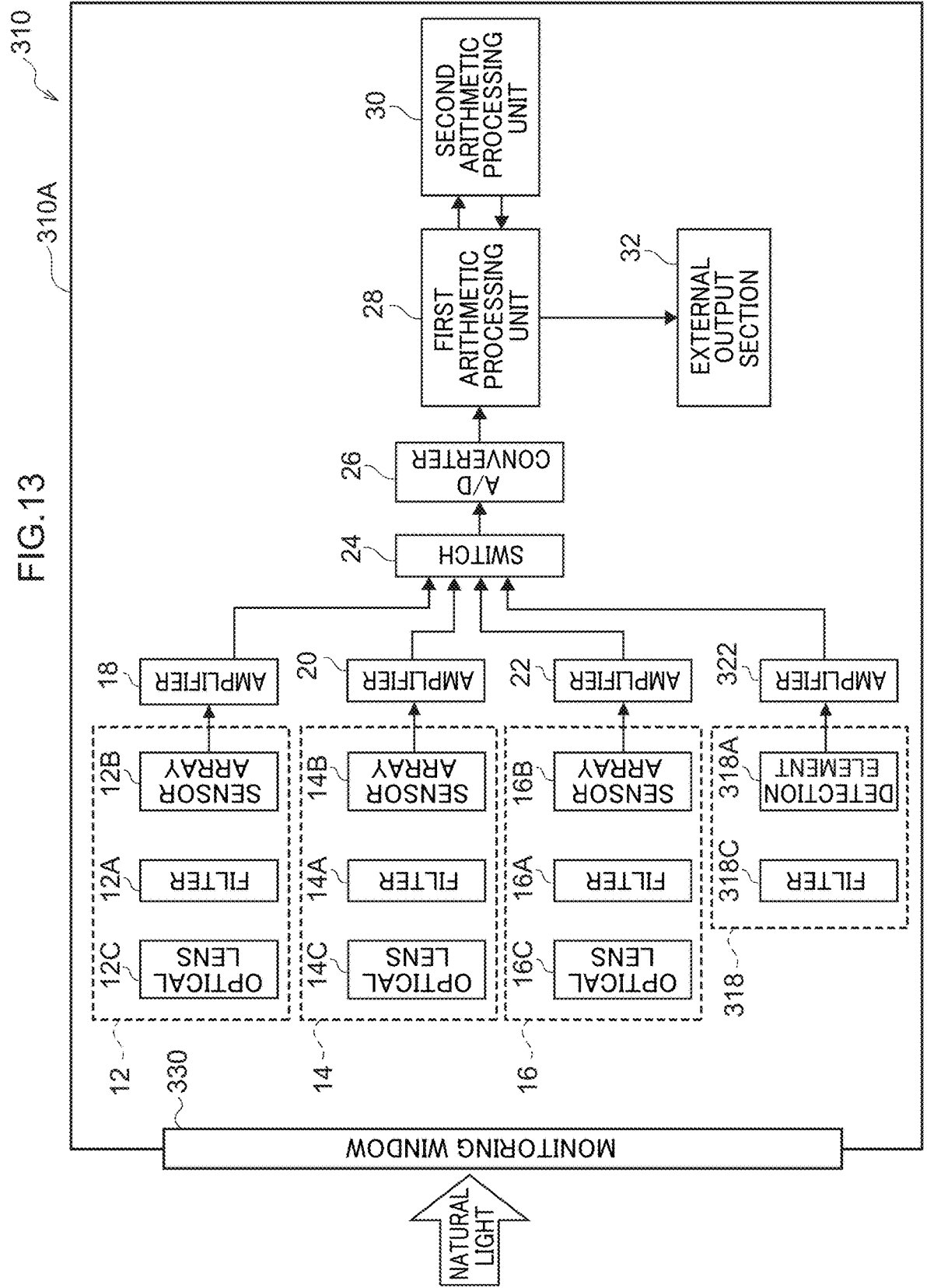
FIG. 13 is a block diagram illustrating configuration of an abnormality detector according to a third exemplary embodiment of the present invention.

As illustrated in FIG. 13, an abnormality detector 310 according to the third exemplary embodiment is provided with a monitoring window 330 in part of a casing 310A. The abnormality detector 310 further includes the first sensor 12, the second sensor 14, the third sensor 16, and a fourth sensor 318. The first sensor 12 detects infrared light in a band in the vicinity of 4.0 μm corresponding to a waveband shorter than the carbon dioxide gas resonance radiation band through the monitoring window 330. The second sensor 14 detects infrared light in a band in the vicinity of 4.5 μm corresponding to the carbon dioxide gas resonance radiation band emitted from flames through the monitoring window 330. The third sensor 16 detects infrared light in a band in the vicinity of 5.0 μm corresponding to a waveband longer than the carbon dioxide gas resonance radiation band through the monitoring window 330. The fourth sensor 318 detects light in a band in the vicinity of 3.0 μm corresponding to a waveband shorter than the other three bands through the monitoring window 330. The abnormality detector 310 further includes the amplifiers 18, 20, 22, an amplifier 322 to amplify a signal from the fourth sensor 318, the switch 24 to amplify signals from the respective amplifiers 18, 20, 22, 322, the A/D converter 26, the first arithmetic processing unit 28, the second arithmetic processing unit 30, and the external output section 32. Note that configuration may be made in which the switch 24 is not provided, and an A/D converter is provided separately for each of the amplifiers 18, 20, 22, 322 such that amplified electrical signals are individually converted into digital values and output to the first arithmetic processing unit 28.

The fourth sensor 318 includes a filter 318A that, out of the natural light that passes through the monitoring window 330, allows the passage of light in a short wavelength region corresponding to at least part of a range including the visible light region of 4.0 μm and below. The fourth sensor 318 further includes a detection element 318B that detects the light that has passed through the filter 318A and converts this light into a DC component electrical signal.

Although the detection elements of the first sensor 12 to the fourth sensor 318 are configured by thermopiles, the detection elements may alternatively be configured by other photovoltaic elements such as InAsSb elements, microbolometer elements that employ changes in resistance, or photoconductive elements such as PbSe elements. Note that such other elements detect infrared rays much faster than thermopiles and microbolometers. This enables an abnormality detector capable of very quickly detecting the presence of flames to be configured using the same circuit configuration, due to the higher speed of A/D conversion.

Figure 14:
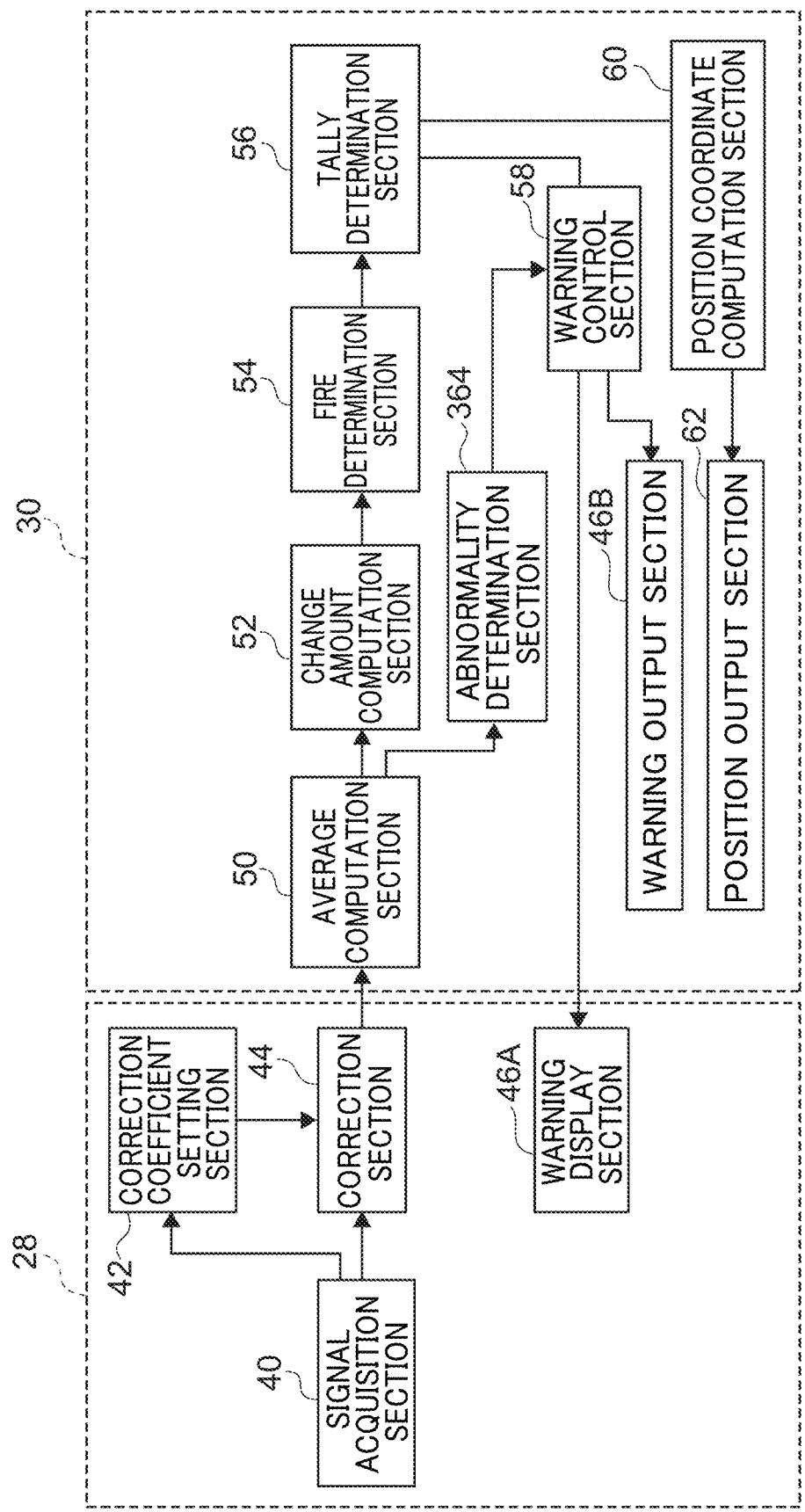
FIG. 14 is a block diagram illustrating configuration of arithmetic processing units of an abnormality detector according to the third exemplary embodiment of the present invention.

The first arithmetic processing unit 28 and the second arithmetic processing unit 30 are each configured by a CPU. When the first arithmetic processing unit 28 and the second arithmetic processing unit 30 are split into functional blocks corresponding to means for implementing respective functionality, as illustrated in FIG. 14, the first arithmetic processing unit 28 includes the signal acquisition section 40, the correction coefficient setting section 42, the correction section 44, and the warning display section 46A. The second arithmetic processing unit 30 includes the average computation section 50, the change amount computation section 52, the fire determination section 54, the tally determination section 56, the warning control section 58, the position coordinate computation section 60, the position output section 62, an abnormality determination section 364, and the warning output section 46B.

The average computation section 50 computes a moving average value of the electrical signal values from each of the detection elements of the first sensor 12 as corrected by the correction section 44. Similarly, the average computation section 50 computes a moving average value of the electrical signal values from each of the detection elements of the second sensor 14 as corrected by the correction section 44. The average computation section 50 similarly computes a moving average value of the electrical signal values from each of the detection elements of the third sensor 16 as corrected by the correction section 44. The average computation section 50 similarly computes a moving average value of the electrical signal values from the detection element 318B of the fourth sensor 318.

Next, explanation follows regarding the principles of dirty window determination.

A system is considered here in which natural light is incident to the monitoring window 330 of the abnormality detector 310 at an intensity $I_0$, and after being partially absorbed by dirt is detected by the detection device at a transmitted light intensity of I. The intensity I can be expressed by the following Equation according to Beer's law.

$$I = I_0 \times \exp(-\alpha x) \quad (1)$$

Wherein $\alpha$ is the absorption coefficient, and x is the thickness of dirt. $\alpha$ can be expressed in terms of extinction coefficient k and light wavelength $\lambda$:

$$\alpha = 4\pi k/\lambda \quad (2)$$

The intensity I can therefore be expressed in the following manner using the light wavelength $\lambda$.

$$I = I_0 \times \exp(-4\pi kx/\lambda) \quad (3)$$

Since kx is a factor related to the amount of dirt on the monitoring window, the transmitted light can be expressed as a relationship between the amount of dirt and the wavelength.

Transmitted light intensities $I_1$, $I_2$ can be expressed in the following manner for a case in which no dirt is present ($k_0$, $x_0$), wherein $I_{1,0}$ is the intensity of a wavelength $\lambda_1$ of the natural light and $I_{2,0}$ is the intensity of a wavelength $\lambda_2$ of the natural light.

$$I_1 = I_{1,0} \times \exp(-4\pi k_0 x_0/\lambda_1) \quad (4)$$

$$I_2 = I_{2,0} \times \exp(-4\pi k_0 x_0/\lambda_2) \quad (5)$$

The ratio of the transmitted light intensities when working correctly can therefore be expressed by the following Equation.

$$\frac{I_1}{I_2} = \left(\frac{I_{1,0}}{I_{2,0}}\right) \exp\left\{4\pi k_0 x_0 \left(\frac{1}{\lambda_2} - \frac{1}{\lambda_1}\right)\right\} \quad (6)$$

Since $k_0$, $x_0$ can be approximated to zero when no dirt is present, the above Equation can be simplified to the following Equation.

$$\frac{I_1}{I_2} = \frac{I_{1,0}}{I_{2,0}} \quad (7)$$

On the other hand, the ratio of transmitted light intensities $I_1'$, $I_2'$ can be expressed in the following manner for a case in which the window is dirty (k', x'), wherein $I_{1,0}'$ is the intensity of the wavelength $\lambda_1$ of the natural light and $I_{2,0}'$ is the intensity of a wavelength $\lambda_2$ of the natural light.

$$\frac{I_{1'}}{I_{2'}} = \left(\frac{I_{1,0'}}{I_{2,0'}}\right) \exp\left\{4\pi k' x' \left(\frac{1}{\lambda_2} - \frac{1}{\lambda_1}\right)\right\} \quad (8)$$

Note that since the ratios of natural light intensities are substantially the same in a given environment, the approximation $I_{1,0}'/I_{2,0}'$ can be made, and Equation 8 can be expressed by the following Equation.

$$\frac{I_{1'}}{I_{2'}} = \left(\frac{I_{1,0}}{I_{2,0}}\right) \exp\left\{4\pi k' x' \left(\frac{1}{\lambda_2} - \frac{1}{\lambda_1}\right)\right\} \quad (9)$$

By taking a ratio between the transmitted light intensity ratios in cases in which the window is not dirty and in cases in which the window is dirty, the following Equation can be derived from Equation 7 and Equation 9.

$$\frac{I_{1'}/I_{2'}}{I_1/I_2} = \left(\frac{I_{1,0}}{I_{2,0}}\right) \exp\left\{4\pi k' x' \left(\frac{1}{\lambda_2} - \frac{1}{\lambda_1}\right)\right\} \quad (10)$$

The ratio between the transmitted light intensity ratios is expressed by Equation 10 as a relationship to the level of dirt (k', x') of the monitoring window, and this ratio decreases together with the level of dirt.

Accordingly, the abnormality detector is capable of determining the level of dirt by comparing the ratios of the transmitted light intensities in a state in which the window is not dirty, for example at the time of initial installation, and a state in which the window is dirty, for example after a freely set duration has elapsed. Moreover, providing a threshold value for the ratio between the transmitted light intensity ratios enables notification to be performed, for example by outputting an alert calling for the window to be cleaned, in cases in which the dirt has reached a given level or greater.

The present exemplary embodiment considers a case in which the amount of dirt is determined using the detection device 318B of the fourth sensor 318 (wavelength region 3.0

[μm]=λ₁) and the detection devices of the third sensor 16 (wavelength region 5.0 [μm]=λ₂). From Equation 10, supposing that the extinction coefficient k is 0.02[–] and a dirt thickness x is 10 [μm] for a case in which only a small amount of dirt is present, and that the extinction coefficient k is 0.1[–] and the dirt thickness x is 10 [μm] for a case in which a large amount of dirt is present, then the ratio between the transmitted light intensity ratios behaves in the following manner in each situation.

First, in the case in which there is only a small amount of dirt present (k=0.02), the ratio between the transmitted light intensity ratios is computed according to the Equation below.

$$\frac{I_{1'}/I_{2'}}{I_1/I_2} = 0.71$$

In the case in which there is a large amount of dirt present (k=0.1), the ratio between the transmitted light intensity ratios is computed according to the Equation below.

$$\frac{I_{1'}/I_{2'}}{I_1/I_2} = 0.19$$

The ratio between the transmitted light intensity ratios decreases together with the level of dirt, and for example windows for which this value is lower than a threshold value of 0.2 may be objectively determined to be dirty. Note that the threshold value may be varied according to the installation location of the abnormality detector since the extinction coefficient k and the dirt thickness x as defined in the above conditions change according to conditions of the dirt (for example the type and color of the dirt).

In cases in which the wavelength region of natural light detected by the detection device 318B of the fourth sensor 318 is close to the wavelength regions of natural light detected by the detection devices of the first sensor 12 to the detection devices of the third sensor 16, the attenuation rates due to dirt will be at a similar level for the detection devices of the first sensor 12 to the third sensor 16, making it difficult to detect dirt. Accordingly, the wavelength region detected by the detection device 318B of the fourth sensor 318 is preferably positioned away toward the visible light side of the wavelength regions of natural light detected by the detection devices of the first sensor 12 to the detection devices of the third sensor 16.

By following the principles described above, in the present exemplary embodiment the abnormality determination section 364 employs the moving average value of the electrical signal values from the detection devices of the third sensor 16 and the moving average value of the electrical signal value from the detection device 318B of the fourth sensor 318 to determine whether or not the monitoring window 330, the third sensor 16, the fourth sensor 318, the amplifiers 18, 20, 22, 322, the switch 24, the A/D converter 26, the first arithmetic processing unit 28, or the second arithmetic processing unit 30 is working correctly.

Specifically, the abnormality determination section 364 follows Equation 10 above to compute the ratio between the ratio of the moving average value of the electrical signal values from the detection devices of the third sensor 16 to the moving average value of the electrical signal value from the detection device 318B of the fourth sensor 318 and the ratio of a pre-derived electrical signal value from the detection devices of the third sensor 16 when working correctly to a pre-derived electrical signal value from the detection devices of the detection device 318B of the fourth sensor 318 when working correctly. The abnormality determination section 364 compares the computed ratio between the ratios against a dirty window warning threshold value, an abnormality warning threshold value, and a sensor fault/light source fault threshold value, and in cases in which the results thereof satisfy a predetermined condition, the abnormality determination section 364 determines that the monitoring window 330, the third sensor 16, the fourth sensor 318, the amplifiers 18, 20, 22, 322, the switch 24, the A/D converter 26, the first arithmetic processing unit 28, or the second arithmetic processing unit 30 is in an abnormal state.

In the present exemplary embodiment, the abnormality determination section 364 determines that the monitoring window 330 is in an abnormal state due to window dirt in cases in which the value of the ratio computed using Equation 10 is the dirty window warning threshold value or greater or the abnormality warning threshold value or greater. The abnormality determination section 364 determines that the third sensor 16, the fourth sensor 318, the amplifiers 18, 20, 22, 322, the switch 24, the A/D converter 26, the first arithmetic processing unit 28, or the second arithmetic processing unit 30 is in an abnormal state in cases in which the value of the ratio computed using Equation 10 is the sensor fault/light source fault threshold value or lower.

In cases in which the abnormality determination section 364 has been determined an abnormal state, the warning control section 58 controls the warning display section 46A and the warning output section 46B to notify of the abnormal state.

Abnormality Detector Operation

Explanation follows regarding operation of the abnormality detector 310 according to the present exemplary embodiment.

First, the abnormality detector 310 is installed at the location where fire determination is required. Then, in a state in which the monitoring window 330, the third sensor 16, the fourth sensor 318, the amplifiers 18, 20, 22, 322, the switch 24, the A/D converter 26, the first arithmetic processing unit 28, and the second arithmetic processing unit 30 are working correctly in an initial state, the abnormality detector 310 acquires electrical signal values from the detection devices of the third sensor 16 and electrical signal values from the detection devices of the fourth sensor 318 and sets these values as values when working correctly.

Electrical signal values are also respectively output from the first sensor 12, the second sensor 14, the third sensor 16, and the fourth sensor 318 of the abnormality detector 310, and values corresponding to the respective signals are input to the first arithmetic processing unit 28 via the amplifiers 18, 20, 22, 322, the switch 24, and the A/D converter 26. When this is performed, the first arithmetic processing unit 28 and the second arithmetic processing unit 30 of the abnormality detector 310 execute the fire determination processing routine illustrated in FIG. 4 and FIG. 5 repeatedly at a given cycle.

Figure 15:
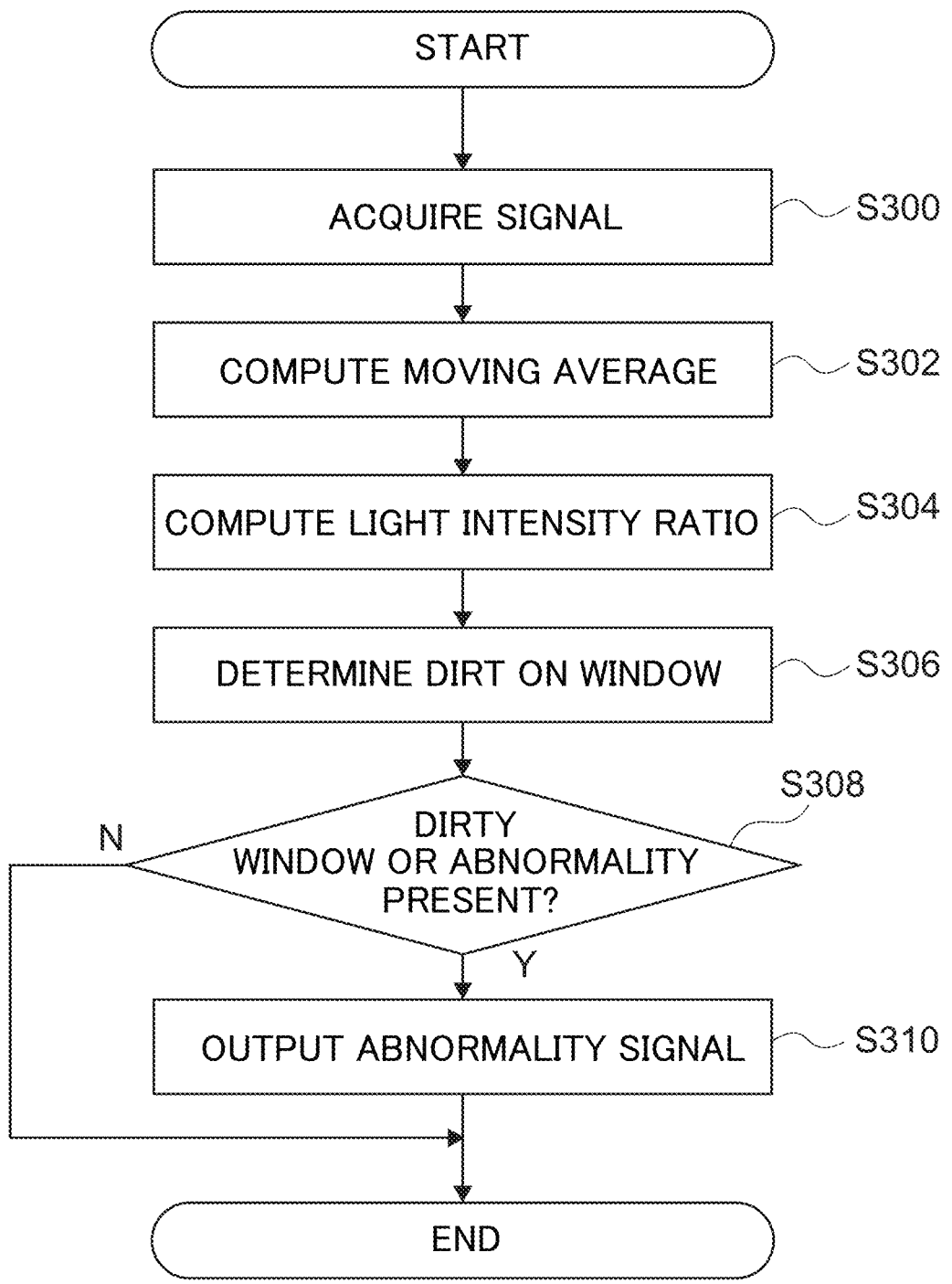
FIG. 15 is a flowchart illustrating an abnormal state determination processing routine performed by arithmetic processing units of an abnormality detector according to the third exemplary embodiment of the present invention.

Furthermore, the first arithmetic processing unit 28 and the second arithmetic processing unit 30 of the abnormality detector 310 execute an abnormal state determination processing routine, illustrated in FIG. 15, each time a given period has elapsed.

At step S300, the signal acquisition section 40 acquires electrical signal values from the first sensor 12, electrical signal values from the second sensor 14, electrical signal values from the third sensor 16, and an electrical signal value from the fourth sensor 318 from the signal output from the A/D converter 26.

At step S302, the average computation section 50 computes moving average values of the electrical signal values from the third sensor 16 and the electrical signal values from the fourth sensor 318, based on the electrical signal values acquired at step S300 and electrical signal values previously acquired at step S300.

Then at step S304, the abnormality determination section 364 computes the ratio of the moving average values based on the moving average value of the electrical signal values from the third sensor 16 and the moving average value of the electrical signal values from the fourth sensor 318. The abnormality determination section 364 also computes the ratio of the pre-derived electrical signal value from the third sensor 16 when working correctly to the pre-derived electrical signal value from the fourth sensor 318 when working correctly. The abnormality determination section 364 then computes the ratio between the moving average value ratio and the electrical signal value ratio when working correctly.

At the next step S306, the abnormality determination section 364 compares the ratio between the moving average value ratio and the electrical signal value ratio when working correctly as respectively computed at step S304 against the dirty window warning threshold value, the abnormality warning threshold value, and the sensor fault/light source fault threshold value to determine whether or not the monitoring window 330, the third sensor 16, the fourth sensor 318, the amplifiers 18, 20, 22, 322, the switch 24, the A/D converter 26, the first arithmetic processing unit 28, or the second arithmetic processing unit 30 is working correctly.

For example, in cases in which the ratio of the moving average value ratio to the electrical signal value ratio when working correctly is the dirty window warning threshold value or greater or the abnormality warning threshold value or greater, an abnormal state due to the monitoring window 330 being dirty is determined to exist.

In cases in which the ratio between the moving average value ratio and the electrical signal value ratio when working correctly is the sensor fault/light source fault threshold value or lower, the third sensor 16, the fourth sensor 318, the amplifiers 18, 20, 22, 322, the switch 24, the A/D converter 26, the first arithmetic processing unit 28, or the second arithmetic processing unit 30 is determined to be in an abnormal state.

At step S308, determination is made as to whether or not an abnormal state has been determined to exist at step S306. In cases in which an abnormal state has been determined to exist, at step S310 the warning control section 48 outputs an abnormality signal to the warning display section 46A and the warning output section 46B, and the abnormal state determination processing routine is ended. On the other hand, in cases in which an abnormal state has not been determined to exist, the abnormal state determination processing routine is ended as-is and fire determination is determined to be operating correctly.

As described above, in the abnormality detector according to the third exemplary embodiment of the present invention, out of the natural light incident from the exterior that passes through the monitoring window, light is detected in two different bands by the respective detection devices. The abnormality detector makes at least one determination out of whether or not the monitoring window is working correctly or whether or not the detection devices are working correctly based on the electrical signal values detected by the respective detection devices. This enables an abnormal state of either the monitoring window or the detection devices to be determined with a simple configuration.

Employing natural light enables a conventional testing light source to be eliminated, thereby enabling not only greater degrees of freedom for casing design, but also cutting power consumption and cutting costs. Moreover, a more reassuring monitoring environment can be achieved since there is no time in which a light source is illuminated or flashing during testing.

By its nature, employing natural light could result in many and varied fluctuations in wavelength intensity, in particular with the change of seasons or time of day, and as a result of noise from vehicle headlights and the like. However, due to employing moving average values, this exemplary embodiment of the present invention is capable of performing abnormality determination in a manner that is robust with respect to fluctuations in the intensity of transmitted light.

Modified Examples

Note that the present invention is not limited to the exemplary embodiments described above, and various modifications may be applied within a range not departing from the spirit of the present invention.

For example, the present invention may be applied to a photoelectric dual smoke detector. A photoelectric dual smoke detector is configured including a detection device configured to detect natural light 5 ($\lambda_2$=0.9 μm) in a near-infrared region that has been incident from the exterior and passed through a window in the casing, and a detection device having detection sensitivity to natural light 6 (wavelength region $\lambda_1$=0.5 μm) with a shorter wavelength than the natural light 5.

When computed under similar conditions to in the example of the abnormality detector described above, the ratio between the transmitted light intensity ratios is computed in the following manner.

In a case in which only a small amount of dirt is present (k=0.02), the ratio between the transmitted light intensity ratios is computed according to the Equation below.

$$\frac{I_{1'}/I_{2'}}{I_1/I_2} = 0.11$$

In a case in which a large amount of dirt is present (k=0.1), the ratio between the transmitted light intensity ratios is computed according to the Equation below.

$$\frac{I_{1'}/I_{2'}}{I_1/I_2} = 1.4 \times 10^{-5}$$

The ratio between the transmitted light intensity ratios decreases together with level of dirt, enabling determination that the window is dirty to be performed in a photoelectric dual smoke detector.

The present invention may also be applied to an infrared camera. In such a case, the infrared camera is configured including a detection device configured to detect natural light 7 ($\lambda_2$=15 μm) in an infrared region that has been incident from the exterior and passed through a window in the casing, and a detection device having detection sensitivity to natural light 8 (wavelength region $\lambda_1=7$ μm) with a shorter wavelength than the natural light 7.

When computed under similar conditions to in the example of the abnormality detector described above, the ratio between the transmitted light intensity ratios is computed in the following manner.

In a case in which only a small amount of dirt is present (k=0.02), the ratio between the transmitted light intensity ratios is computed according to the Equation below.

$$\frac{I_{1'}/I_{2'}}{I_1/I_2} = 0.83$$

In a case in which a large amount of dirt is present (k=0.1), the ratio between the transmitted light intensity ratios is computed according to the Equation below.

$$\frac{I_{1'}/I_{2'}}{I_1/I_2} = 0.38$$

The ratio between the transmitted light intensity ratios decreases together with the level of dirt, enabling determination that the window is dirty to be performed in an infrared camera.

The present invention may also be applied to abnormality detectors other than the above abnormality detector, smoke detector, or infrared camera.

Moreover, abnormality determination may be performed without employing electrical signal values detected when working correctly. In such cases, the transmitted light intensity ratio computed using Equation 9 may be compared against a threshold value to perform abnormality determination.

Moreover, abnormality determination may be performed without computing a moving average value of the detected electrical signal values. In such cases, a ratio of the electrical signal values from the third sensor 16 to the electrical signal value from the fourth sensor 318 may be computed in order to perform abnormality determination.

In the above explanation, explanation has been given regarding an example of a case in which the ratio between the transmitted light intensity ratios is computed according to Equation 10 and compared against a threshold value to perform abnormality determination on the assumption that $\lambda_1$ is smaller than $\lambda_2$. However, there is no limitation thereto. The ratio between the transmitted light intensity ratios may be computed according to Equation 10 on the assumption that $\lambda_2$ is smaller than $\lambda_1$. In such cases, abnormality determination may be performed taking into account the fact that the magnitude relationship with respect to the threshold value will be inverted.

Although explanation has been given regarding an example of a case in which sensor arrays are employed in each of the first sensor 12, the second sensor 14, and the third sensor 16, there is no limitation thereto. Configuration may be made in which at least one out of the first sensor 12, the second sensor 14, or the third sensor 16 employs a sensor array. For example, the first sensor 12 may be configured employing the sensor array 12B, while the second sensor 14 and the third sensor 16 are each configured by a single detection device instead of a sensor array. In such cases, the first change amount, the second change amount, and the third change amount may be computed individually for respective detection devices of the sensor array 12B, and when performing fire determination, a value computed for the single detection device of the second sensor 14 may be commonly employed as the second change amount, and the value computed for the single detection device of the third sensor 16 may be commonly employed as the third change amount.

Fourth Exemplary Embodiment

Explanation follows regarding an abnormality detector of a fourth exemplary embodiment of the present invention. Note that sections configured similarly to in the second exemplary embodiment and the third exemplary embodiment are allocated the same reference numerals, and explanation thereof is omitted.

Figure 16:
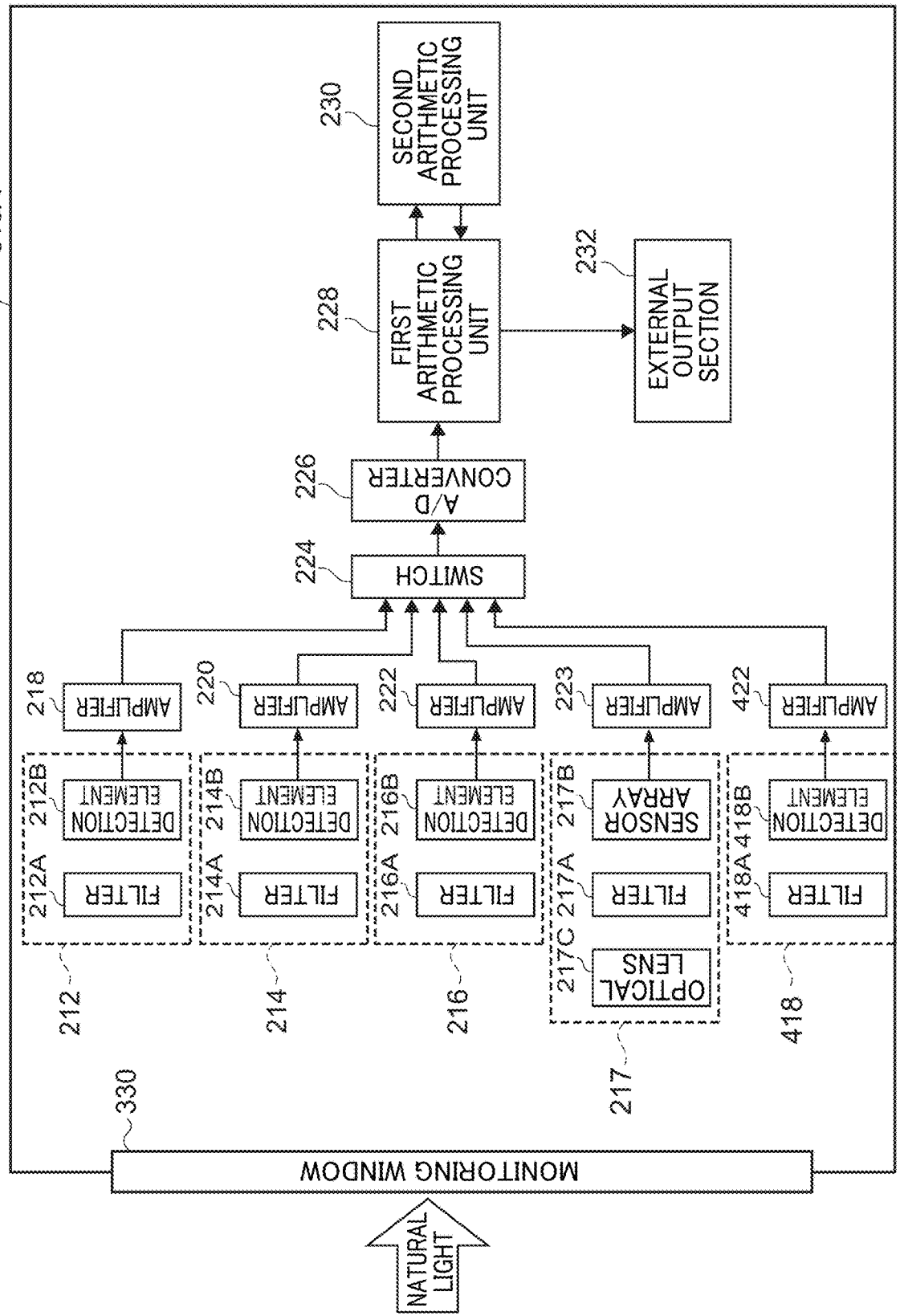
FIG. 16 is a block diagram illustrating configuration of an abnormality detector according to a fourth exemplary embodiment of the present invention.

As illustrated in FIG. 16, an abnormality detector 410 according to the fourth exemplary embodiment is provided with a monitoring window 330 in part of a casing 310A. The abnormality detector 410 further includes a first sensor 212, a second sensor 214, a third sensor 216, a fourth sensor 217, and a fifth sensor 418. The first sensor 212 detects infrared light in a band in the vicinity of 4.0 μm corresponding to a waveband shorter than the carbon dioxide gas resonance radiation band through the monitoring window 330. The second sensor 214 detects infrared light in a band in the vicinity of 4.5 μm corresponding to the carbon dioxide gas resonance radiation band emitted from flames through the monitoring window 330. The third sensor 216 detects infrared light in a band in the vicinity of 5.0 μm corresponding to a waveband longer than the carbon dioxide gas resonance radiation band through the monitoring window 330. The fourth sensor 217 detects infrared light in a band from the vicinity of 2.0 μm to the vicinity of 5.0 μm through the monitoring window 330. The fifth sensor 418 detects light in a short wavelength region corresponding to at least part of a range including the visible light region of 4.0 μm and below through the monitoring window 330. The abnormality detector 410 further includes the amplifiers 218, 220, 222, 223, an amplifier 422 to amplify a signal from the fifth sensor 418, a switch 224 to amplify signals from the respective amplifiers 218, 220, 222, 223, 422, an A/D converter 226, a first arithmetic processing unit 228, a second arithmetic processing unit 230, and an external output section 232. Alternatively, configuration may be made in which the switch 224 is not provided, and an A/D converter is provided separately for each of the amplifiers 218, 220, 222, 223, 422 such that amplified electrical signals are individually converted into digital values and output to the first arithmetic processing unit 228.

The fifth sensor 418 includes a filter 418A that, out of the natural light that passes through the monitoring window 330, allows the passage of light in a short wavelength region corresponding to at least part of a range including the visible light region of 4.0 μm and below. The fifth sensor 418 further includes a detection device 418B that detects the light that has passed through the filter 418A and converts this light into a DC component electrical signal.

Figure 17:
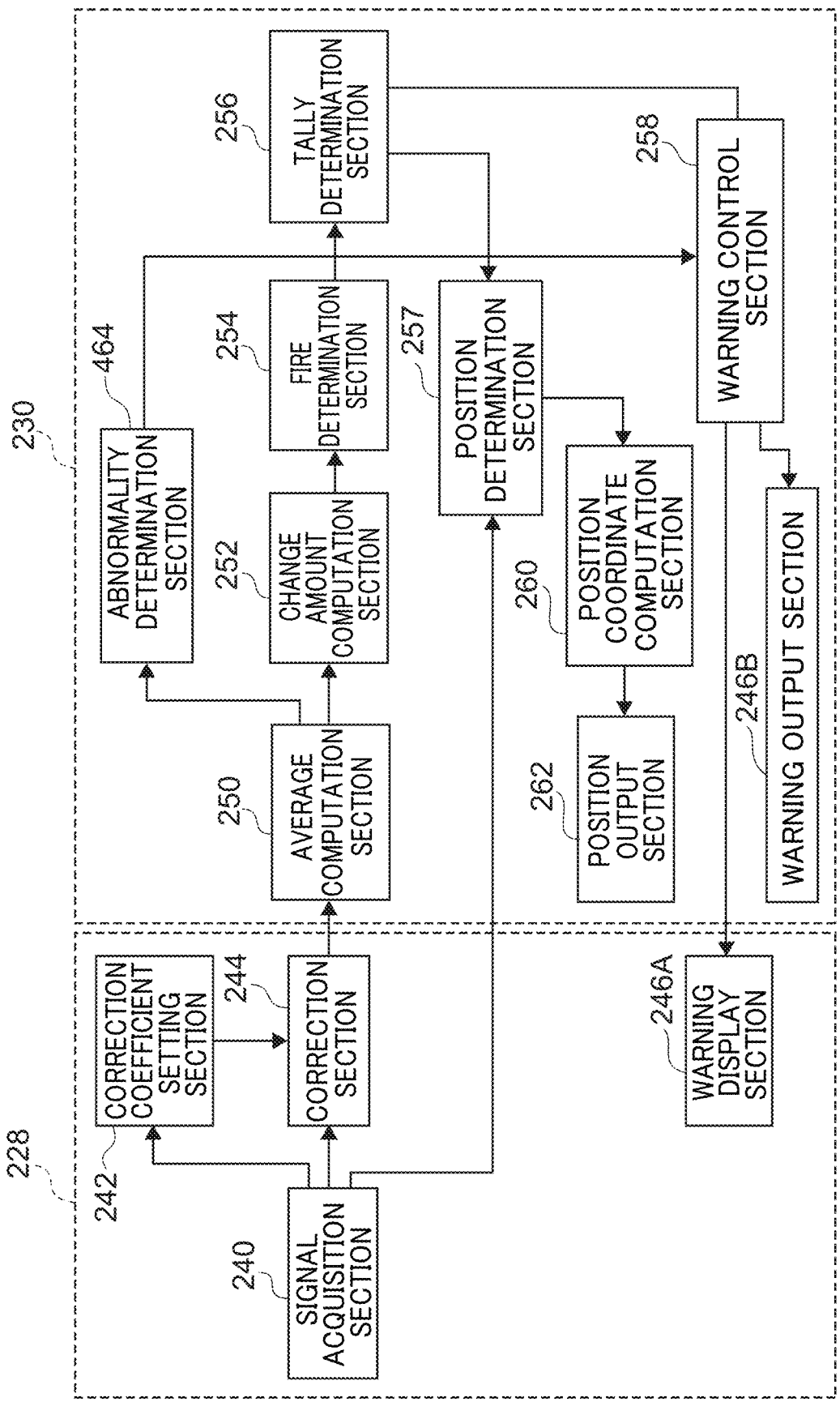
FIG. 17 is a block diagram illustrating configuration of arithmetic processing units of an abnormality detector according to the fourth exemplary embodiment of the present invention.

The first arithmetic processing unit 228 and the second arithmetic processing unit 230 are each configured by a CPU. When the first arithmetic processing unit 228 and the second arithmetic processing unit 230 are split into functional blocks corresponding to means for implementing respective functionality, as illustrated in FIG. 17, the first arithmetic processing unit 228 includes the signal acquisition section 240, the correction coefficient setting section 242, the correction section 244, and the warning display section 246A. The second arithmetic processing unit 230 includes the average computation section 250, the change amount computation section 252, the fire determination section 254, the tally determination section 256, the warning control section 258, the position coordinate computation section 260, the position output section 262, an abnormality determination section 464, and the warning output section 246B.

The average computation section 250 computes for the detection device 212B of the first sensor 212 a moving average value (for example an average value for the preceding 100 seconds) of the electrical signal value from the detection device 212B as corrected by the correction section 244. Similarly, the average computation section 250 computes for the detection device 214B of the second sensor 214 a moving average value of the electrical signal value from the detection device 214B as corrected by the correction section 244. The average computation section 250 similarly computes for the detection device 216B of the third sensor 216 a moving average value of the electrical signal value from the detection device 216B as corrected by the correction section 244. The average computation section 250 similarly computes a moving average value of the electrical signal value from the detection device 418B of the fifth sensor 418.

The abnormality determination section 464 employs the moving average value of the electrical signal value from the detection device 216B of the third sensor 216 and the moving average value of the electrical signal value from the detection device 418B of the fifth sensor 418 to determine whether or not the monitoring window 330, the third sensor 216, the fifth sensor 418, the amplifiers 218, 220, 222, 223, 422, the switch 224, the A/D converter 226, the first arithmetic processing unit 228, or the second arithmetic processing unit 230 is working correctly.

Specifically, the abnormality determination section 464 follows Equation 10 above to compute the ratio between the ratio of the moving average value of the electrical signal value from the detection device 216B of the third sensor 216 to the moving average value of the electrical signal value from the detection device 418B of the fifth sensor 418 and the ratio of a pre-derived electrical signal value from the detection device 216B of the third sensor 216 when working correctly to a pre-derived electrical signal value from the detection device 418B of the fifth sensor 418 when working correctly. The abnormality determination section 464 compares the computed ratio between the ratios to a dirty window warning threshold value, an abnormality warning threshold value, and a sensor fault/light source fault threshold value, and in cases in which the results thereof satisfy a predetermined condition, the abnormality determination section 464 determines that the monitoring window 330, the third sensor 16, the fifth sensor 418, the amplifiers 218, 220, 222, 223, 422, the switch 224, the A/D converter 226, the first arithmetic processing unit 228, or the second arithmetic processing unit 230 is in an abnormal state.

In cases in which the abnormality determination section 464 has determined an abnormal state, the warning control section 258 controls the warning display section 246A and the warning output section 246B to notify of the abnormal state.

Note that other configurations and operation of the abnormality detector 410 according to the fourth exemplary embodiment are similar to those of the second exemplary embodiment and the third exemplary embodiment, and so explanation thereof is omitted.

The disclosures of Japanese Patent Application Nos. 2017-088953 and 2017-088954 are incorporated in their entirety by reference herein.

All cited documents, patent applications, and technical standards mentioned in the present specification are incorporated by reference in the present specification to the same extent as if each individual cited document, patent application, or technical standard was specifically and individually indicated to be incorporated by reference.

The invention claimed is:

1. An abnormality detector comprising:
a plurality of band filters including:
    a first band filter configured to allow passage of infrared light in a first band including a peak wavelength of a carbon dioxide gas resonance radiation band,
    a second band filter configured to allow passage of infrared light in a second band that is different from the first band, and that has a band center positioned away from a band center of the carbon dioxide gas resonance radiation band, and
    a third band filter configured to allow passage of infrared light in a third band that is different from both the first band and the second band, and that has a band center positioned away from the band center of the carbon dioxide gas resonance radiation band;
a detection section including:
    a first sensor array arrayed in a two-dimensional pattern and having first detection devices each configured to detect infrared light that has passed through the first band filter and convert the infrared light into an electrical signal,
    a second sensor array arrayed in a two-dimensional pattern and having second detection devices each configured to detect infrared light that has passed through the second band filter and convert the infrared light into an electrical signal, and
    a third sensor array arrayed in a two-dimensional pattern and having third detection devices each configured to detect infrared light that has passed through the third band filter and convert the infrared light into an electrical signal,
    the respective first detection devices of the first sensor array being disposed so as to correspond to the respective second detection devices of the second sensor array and the respective third detection devices of the third sensor array; and
a determination section configured to determine, for each of the detection devices, whether a flame or an abnormal temperature has been detected based on any combination of electrical signal values among an electrical signal value detected by a corresponding detection device from out of the first detection devices, an electrical signal value detected by the corresponding second detection device, or an electrical signal value detected by the corresponding third detection device, and also to determine a predetermined position of a detection device determined to have detected a flame or an abnormal temperature as being a position where the flame or the abnormal temperature has been detected.

2. The abnormality detector of claim 1, wherein:
the plurality of band filters further include an abnormality determination band filter configured to allow, of externally incident natural light that has passed through a monitoring window, passage of light in a predetermined band that is different from the first band, the second band, and the third band;

the detection section further includes a detection device to detect light that has passed through the abnormality determination band filter and to convert the light into an electrical signal; and the abnormality detector further comprises an abnormality determination section configured to determine at least one of whether the monitoring window is working correctly or whether the detection devices are working correctly, based on electrical signal values detected by the respective detection devices of the detection section.

3. An abnormality detector comprising:

a plurality of band filters including:
- a first band filter configured to allow passage of infrared light in a first band including a peak wavelength of a carbon dioxide gas resonance radiation band,
- a second band filter configured to allow passage of infrared light in a second band that is different from the first band, and that has a band center positioned away from a band center of the carbon dioxide gas resonance radiation band, and
- a third band filter configured to allow passage of infrared light in a third band that is different from both the first band and the second band, and that has a band center positioned away from the band center of the carbon dioxide gas resonance radiation band;

a detection section including detection devices respectively provided to each of the plurality of band filters and configured to detect infrared light that has passed through the corresponding band filter and convert the infrared light into an electrical signal, a detection device provided at at least one of the plurality of band filters comprising a sensor array arrayed in a two-dimensional pattern;

a determination section configured to determine whether a flame or an abnormal temperature has been detected, based on values of the electrical signals detected by the respective detection devices of the detection section;

an average computation section configured to compute an average value of the electrical signal detected by the detection device for each of the detection devices; and a change amount computation section configured to compute, for each of the detection devices, a change amount from the average value of the electrical signal detected by the detection device, wherein the determination section is configured to determine whether a flame or an abnormal temperature has been detected by comparing one or more of the change amounts computed by the change amount computation section for the respective detection devices against a determination threshold value.

4. The abnormality detector of claim 3, wherein the determination section is further configured to determine a position where a flame or abnormal temperature has been detected.

5. The abnormality detector of either claim 3, wherein:

the detection section includes:
- a first sensor array arrayed in a two-dimensional pattern and having first detection devices each configured to detect infrared light that has passed through the first band filter and convert the infrared light into an electrical signal,
- a second sensor array arrayed in a two-dimensional pattern and having second detection devices each configured to detect infrared light that has passed through the second band filter and convert the infrared light into an electrical signal, and
- a third sensor array arrayed in a two-dimensional pattern and having third detection devices each configured to detect infrared light that has passed through the third band filter and convert the infrared light into an electrical signal; and the determination section is configured to determine whether a flame or an abnormal temperature has been detected based on any combination of electrical signal values among an electrical signal value detected by the respective first detection devices of the first sensor array, an electrical signal value detected by the respective second detection devices of the second sensor array, or an electrical signal value detected by the respective third detection devices of the third sensor array.

6. The abnormality detector of claim 5, wherein:

the respective first detection devices of the first sensor array are disposed so as to correspond to the respective second detection devices of the second sensor array and the respective third detection devices of the third sensor array; and the determination section is configured to determine, for each of the detection devices, whether a flame or an abnormal temperature has been detected based on any combination of electrical signal values among an electrical signal value detected by a corresponding detection device of the first detection devices, an electrical signal value detected by the corresponding second detection device, and an electrical signal value detected by the corresponding third detection device, and also to determine a predetermined position of a detection device determined to have detected a flame or an abnormal temperature as being a position where the flame or the abnormal temperature has been detected.

7. The abnormality detector of claim 5, wherein:

the respective first detection devices of the first sensor array are disposed so as to correspond to the respective second detection devices of the second sensor array and the respective third detection devices of the third sensor array; and the determination section is configured to determine, for respective blocks within the sensor arrays, whether a flame or an abnormal temperature has been detected based on any combination of electrical signal values among an electrical signal value detected by the respective first detection devices included in a corresponding block among the blocks in the first sensor array, an electrical signal value detected by the respective second detection devices included in the corresponding block in the second sensor array, and an electrical signal value detected by the respective third detection devices included in the corresponding block in the third sensor array, and also to determine a predetermined position of the block determined to have detected the flame or the abnormal temperature as being a position where the flame or the abnormal temperature has been detected.

8. The abnormality detector of claim 5, further comprising:

an average computation section configured to compute, for each of the first detection devices of the first sensor array, a first average value of an electrical signal detected by the first detection device, compute, for each of the second detection devices of the second sensor array, a second average value of an electrical signal detected by the second detection device, and compute, for each of the third detection devices of the third sensor array, a third average value of an electrical signal detected by the third detection device; and a change amount computation section configured to compute, for each of the first detection devices of the first sensor array, a first change amount from the first average value of the electrical signal detected by the first detection device, compute, for each of the second detection devices of the second sensor array, a second change amount from the second average value of the electrical signal detected by the second detection device, and compute, for each of the third detection devices of the third sensor array, a third change amount from the third average value of the electrical signal detected by the third detection device, wherein the determination section is configured to determine whether a flame or an abnormal temperature has been detected by comparing one or more of the first change amount, the second change amount, or the third change amount computed by the change amount computation section against a determination threshold value.

9. The abnormality detector of claim 3, wherein:

the plurality of band filters further include an abnormality determination band filter configured to allow, of externally incident natural light that has passed through a monitoring window, passage of light in a predetermined band that is different from the first band, the second band, and the third band;

the detection section further includes a detection device to detect light that has passed through the abnormality determination band filter and to convert the light into an electrical signal; and the abnormality detector further comprises an abnormality determination section configured to determine at least one of whether the monitoring window is working correctly or whether the detection devices are working correctly, based on electrical signal values detected by the respective detection devices of the detection section.

10. An abnormality detector comprising:

a plurality of band filters including:
  a first band filter configured to allow passage of infrared light in a first band including a peak wavelength of a carbon dioxide gas resonance radiation band,
  a second band filter configured to allow passage of infrared light in a second band that is different from the first band, and that has a band center positioned away from a band center of the carbon dioxide gas resonance radiation band,
  a third band filter configured to allow passage of infrared light in a third band that is different from both the first band and the second band, and that has a band center positioned away from the band center of the carbon dioxide gas resonance radiation band, and
  a fourth band filter configured to allow passage of infrared light in a predetermined band;

a detection section including:
  a first detection device configured to detect infrared light that has passed through the first band filter and convert the infrared light into an electrical signal;
  a second detection device configured to detect infrared light that has passed through the second band filter and convert the infrared light into an electrical signal;
  a third detection device configured to detect infrared light that has passed through the third band filter and convert the infrared light into an electrical signal, and
  a sensor array arrayed in a two-dimensional pattern and having fourth detection devices each configured to detect infrared light that has passed through the fourth band filter and convert the infrared light into an electrical signal; and a determination section configured to:
  determine whether a flame or an abnormal temperature has been detected based on any combination of electrical signal values among an electrical signal value detected by the first detection device, an electrical signal value detected by the second detection device, or an electrical signal value detected by the third detection device, and
  in a case in which determination has been made that a flame or an abnormal temperature has been detected, to determine a position where the flame or the abnormal temperature has been detected based on electrical signal values detected by the respective fourth detection devices of the sensor array.

11. The abnormality detector of claim 10, wherein, based on the electrical signal value detected by each of the fourth detection devices of the sensor array, the determination section is configured to determine a predetermined position of the fourth detection device where the electrical signal value is a threshold value or greater as being a position where a flame or an abnormal temperature has been detected.

12. The abnormality detector of claim 10, wherein the determination section is configured to derive, for respective blocks of the sensor array, an average value of the electrical signal values detected by the respective fourth detection devices included in the corresponding block, and to determine a predetermined region of the block, for which the average value of the electrical signal values is a threshold value or greater, as being a position where a flame or an abnormal temperature has been detected.

13. The abnormality detector of claim 10, further comprising:

an average computation section configured to compute a first average value of the electrical signal detected by the first detection device, compute a second average value of the electrical signal detected by the second detection device, and compute a third average value of the electrical signal detected by the third detection device; and a change amount computation section configured to compute a first change amount from the first average value of the electrical signal detected by the first detection device, compute a second change amount from the second average value of the electrical signal detected by the second detection device, and compute a third change amount from the third average value of the electrical signal detected by the third detection device, wherein the determination section is configured to determine whether a flame or an abnormal temperature has been detected by comparing one or more of the first change amount, the second change amount, or the third change amount computed by the change amount computation section against a determination threshold value.

14. The abnormality detector claim 10, further comprising:

an average computation section configured to compute, for each of the fourth detection devices of the sensor array, an average value of the electrical signal detected by the fourth detection device; and a change amount computation section configured to compute, for each of the fourth detection devices of the sensor array, a change amount from the average value of the electrical signal detected by the fourth detection device, wherein, in a case in which determination has been made that a flame or an abnormal temperature has been detected, the determination section is configured to determine a position where a flame or an abnormal temperature has been detected based on the change amount computed for each of the fourth detection devices of the sensor array.

15. The abnormality detector of claim 10, wherein:

the plurality of band filters further include an abnormality determination band filter configured to allow, of externally incident natural light that has passed through a monitoring window, passage of light in a predetermined band that is different from the first band, the second band, and the third band;

the detection section further includes a detection device to detect light that has passed through the abnormality determination band filter and to convert the light into an electrical signal; and the abnormality detector further comprises an abnormality determination section configured to determine at least one of whether the monitoring window is working correctly or whether the detection devices are working correctly, based on electrical signal values detected by the respective detection devices of the detection section.

16. The abnormality detector of claim 15, wherein the abnormality determination section is configured to determine at least one of whether the monitoring window is working correctly or whether the detection devices are working correctly, based on a ratio of an electrical signal value detected by the detection device corresponding to the first band filter, the second band filter, or the third band filter, to an electrical signal value detected by the detection device corresponding to the abnormality determination band filter.

17. The abnormality detector of claim 15, wherein the abnormality determination section is configured to determine at least one of whether the monitoring window is working correctly or whether the detection devices are working correctly, based on an electrical signal detected by the detection device corresponding to the first band filter, the second band filter, or the third band filter, an electrical signal detected by the detection device corresponding to the abnormality determination band filter, a pre-derived electrical signal detected when working correctly by the detection device corresponding to the first band filter, the second band filter, or the third band filter, and an electrical signal detected when working correctly by the detection device corresponding to the abnormality determination band filter.

18. The abnormality detector of claim 17, wherein the abnormality determination section is configured to determine at least one of whether the monitoring window is working correctly or whether the detection devices are working correctly, based on: a ratio of an electrical signal value detected by the detection device corresponding to the first band filter, the second band filter, or the third band filter to an electrical signal value detected by the detection device corresponding to the abnormality determination band filter, or a ratio of an electrical signal value detected when working correctly by the detection device corresponding to the first band filter, the second band filter, or the third band filter to an electrical signal value detected when working correctly by the detection device corresponding to the abnormality determination band filter.

19. The abnormality detector of claim 15, further comprising an average computation section configured to compute, for each of the detection devices of the detection section, a moving average value of the electrical signal detected by the detection device, wherein the abnormality determination section is configured to determine at least one of whether the monitoring window is working correctly or whether the detection devices are working correctly, based on a ratio of a moving average value of the electrical signal detected by the detection device corresponding to the first band filter, the second band filter, or the third band filter, to a moving average value of the electrical signal detected by the detection device corresponding to the abnormality determination band filter.

* * * * *